(12) United States Patent
Kwon et al.

(10) Patent No.: US 11,656,476 B2
(45) Date of Patent: May 23, 2023

(54) FOLDED MODULE AND PORTABLE ELECTRONIC DEVICE INCLUDING A FOLDED MODULE

(71) Applicant: Samsung Electro-Mechanics Co., Ltd., Suwon-si (KR)

(72) Inventors: Young Hwan Kwon, Suwon-si (KR); Nam Ki Park, Suwon-si (KR); Young Bok Yoon, Suwon-si (KR); Kyung Hun Lee, Suwon-si (KR); Soon Seok Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 64 days.

(21) Appl. No.: 17/142,717

(22) Filed: Jan. 6, 2021

(65) Prior Publication Data

US 2021/0286193 A1    Sep. 16, 2021

(30) Foreign Application Priority Data

Mar. 16, 2020   (KR) .................. 10-2020-0032090
Jun. 29, 2020   (KR) .................. 10-2020-0079633

(51) Int. Cl.
*G03B 5/00*     (2021.01)
*G03B 17/17*    (2021.01)
(Continued)

(52) U.S. Cl.
CPC ............. *G02B 27/646* (2013.01); *G02B 7/18* (2013.01); *G02B 13/0065* (2013.01);
(Continued)

(58) Field of Classification Search
None
See application file for complete search history.

(56) References Cited

U.S. PATENT DOCUMENTS

2015/0002683 A1   1/2015   Hu et al.
2015/0288865 A1   10/2015  Osborne
(Continued)

FOREIGN PATENT DOCUMENTS

CN   106164766 A   11/2016
CN   108398806 A    8/2018
(Continued)

OTHER PUBLICATIONS

Korean Office Action dated Jul. 14, 2021, in counterpart Korean Patent Application No. 10-2020-0079633 (5 pages in English and 4 pages in Korean).
(Continued)

*Primary Examiner* — Derek S. Chapel
(74) *Attorney, Agent, or Firm* — NSIP Law

(57) ABSTRACT

A folded module includes a housing, a carrier provided in the housing, and a rotation holder provided on the carrier and including a reflective member. The carrier is rotatable, with respect to the housing, around a first axis formed by one rotating shaft ball, the rotation holder is rotatable with respect to the carrier around a second axis formed by two ball members, and the first axis and the second axis intersect each other, and the one rotating shaft ball and the two ball members are provided together on a plane on which both the first axis and the second axis are provided.

18 Claims, 25 Drawing Sheets

(51) Int. Cl.
*G02B 7/18* (2021.01)
*G02B 26/08* (2006.01)
*G02B 27/64* (2006.01)
*H04M 1/02* (2006.01)
*G02B 13/00* (2006.01)

(52) U.S. Cl.
CPC ............ *G02B 26/085* (2013.01); *G03B 5/00* (2013.01); *G03B 17/17* (2013.01); *H04M 1/0264* (2013.01); *G03B 2205/0023* (2013.01); *G03B 2205/0069* (2013.01)

(56) References Cited

U.S. PATENT DOCUMENTS

| | | |
|---|---|---|
| 2016/0269602 A1 | 9/2016 | Osborne |
| 2018/0224665 A1 | 8/2018 | Im et al. |
| 2018/0367714 A1 | 12/2018 | Im et al. |
| 2020/0174270 A1 | 6/2020 | Enta et al. |
| 2020/0333622 A1 | 10/2020 | Fujisaki et al. |
| 2020/0363626 A1* | 11/2020 | Seo ................. G02B 26/085 |
| 2021/0048650 A1* | 2/2021 | Yedid ................. G01P 13/00 |
| 2021/0181460 A1* | 6/2021 | Lee ................... G03B 5/00 |

FOREIGN PATENT DOCUMENTS

| | | |
|---|---|---|
| CN | 110401789 A | 11/2019 |
| JP | 2015-11353 A | 1/2015 |
| JP | 6613005 B1 | 11/2019 |
| KR | 10-2016-0140905 A | 12/2016 |
| KR | 10-2018-0097228 A | 8/2018 |
| KR | 10-2018-0137277 A | 12/2018 |
| KR | 10-2019-0136083 A | 12/2019 |
| KR | 10-2020-0013020 A | 2/2020 |

OTHER PUBLICATIONS

Chinese Office Action dated Nov. 3, 2022, in counterpart Chinese Patent Application No. 202110270056.9 (7 Pages in Chinese, 4 Pages in English).

* cited by examiner

FOLDED MODULE AND PORTABLE ELECTRONIC DEVICE INCLUDING A FOLDED MODULE

CROSS-REFERENCE TO RELATED APPLICATIONS

This application claims the benefit under 35 USC 119(a) of Korean Patent Application No. 10-2020-0032090 filed on Mar. 16, 2020, and Korean Patent Application No. 10-2020-0079633 filed on Jun. 29, 2020, in the Korean Intellectual Property Office, the entire disclosures of which are incorporated herein by reference for all purposes.

BACKGROUND

1. Field

The following description relates to a folded module and a portable electronic device including a Folded Module.

2. Description of the Background

In recent years, cameras have been basically employed in portable electronic devices such as smartphones, tablet personal computers (PCs), and laptops, and autofocusing (AF), optical image stabilization (OIS), zoom functions and the like have been added to cameras for mobile terminals.

In addition, a camera module may be provided with an actuator directly moving a lens module or indirectly moving a reflection module including a reflective member to correct shake. In addition, the actuator may move the lens module or the reflection module in a direction intersecting that of an optical axis with driving force of a magnet and a coil.

On the other hand, in recent years, demand for video recording devices has increased rapidly, and there is a problem in that it is difficult to accurately correct shaking when shaking occurs continuously, such as in video recording, in the related art.

In addition, when a subject to be imaged moves during video recording, there may be inconvenience in that the user must directly move a mobile communications terminal to adjust the imaging direction of the camera module to the moving subject, and it may be difficult to accurately capture video footage.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a folded module includes a housing, a carrier disposed in the housing, and a rotation holder disposed on the carrier and including a reflective member. The carrier is rotatable, with respect to the housing, around a first axis formed by one rotating shaft ball, the rotation holder is rotatable with respect to the carrier around a second axis formed by two ball members, and the first axis and the second axis intersect each other, and the one rotating shaft ball and the two ball members are disposed on a plane including both the first axis and the second axis.

When viewed in a first axis direction, the rotating shaft ball and the two ball members may be aligned in a second axis direction.

The carrier may include a first magnet for driving, and the rotation holder may include a second magnet for driving, and the first magnet and the second magnet may have a rounded shape.

Inner side ends of the first magnet and the second magnet may correspond to an arc shape of a circle centered on the rotating shaft ball.

The housing may include a first coil and a second coil which face the first magnet and the second magnet, in the housing.

At least one of the first coil and the second coil may be provided in plural.

The at least one of the first coil and the second coil provided in plural may be disposed in a bent shape as a whole.

The carrier may be supported on the housing by the one rotating shaft ball and two guide balls.

The carrier may include a first magnet for driving, and a center of the first magnet may be disposed inside of a triangle formed by the one rotating shaft ball and the two guide balls.

The guide ball may be disposed in a first guide portion and a second guide portion which are provided in the carrier and the housing, respectively.

The first guide portion and the second guide portion may have a linear shape.

One of the first guide portion and the second guide portion may have a width wider than a width of the other, for the guide ball to only contact a bottom surface while the guide ball is moving.

The guide ball may be supported by two points on both sides of one of the first guide portion and the second guide portion, and may be supported by one point only on a bottom surface of the other.

Positions of the one rotating shaft ball and the two ball members may be fixed.

A portable electronic device may include a plurality of camera modules having different angles of view, wherein at least one of the plurality of camera modules may be a camera module comprising the folded module.

The plurality of camera modules may be disposed in a plurality of cameras.

In another general aspect, a folded module includes a housing having an internal space of which at least a portion is rounded, a carrier disposed in the internal space and at least partially rounded, and a rotation holder disposed on the carrier. The carrier is rotatable, with respect to the housing, about a first axis, and both the rounded shape of the internal space and the rounded shape of the carrier correspond to a shape of an arc of a circle centered on the first axis.

A portable electronic device may include a plurality of cameras having camera modules having different angles of view, wherein at least one of the plurality of camera modules may include the folded module.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
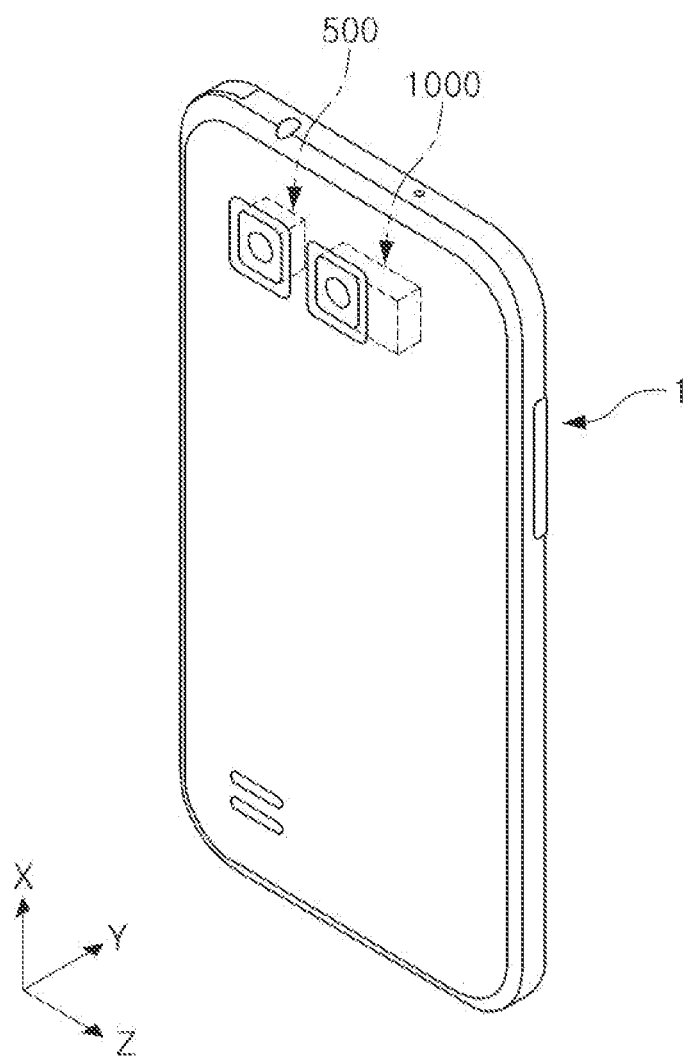
FIGS. 1A and 1B are perspective views of portable electronic devices according to one or more examples.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that would be well known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an embodiment or example, for example, as to what an embodiment or example may include or implement, means that at least one embodiment or example exists in which such a feature is included or implemented while all embodiments and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," "lower," and the like, may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of this disclosure. Further, although the examples described herein have a variety of configurations, other configurations are possible as will be apparent after an understanding of this disclosure.

Examples disclosed herein describe a folded module in which shaking may be easily controlled in not only imaging a fixed subject, but also in capturing video of a moving subject, and a camera module including the same.

Examples disclosed herein describe a folded module capable of tracking a moving subject and correcting shake, and a portable electronic device including the same.

Figure 1B:
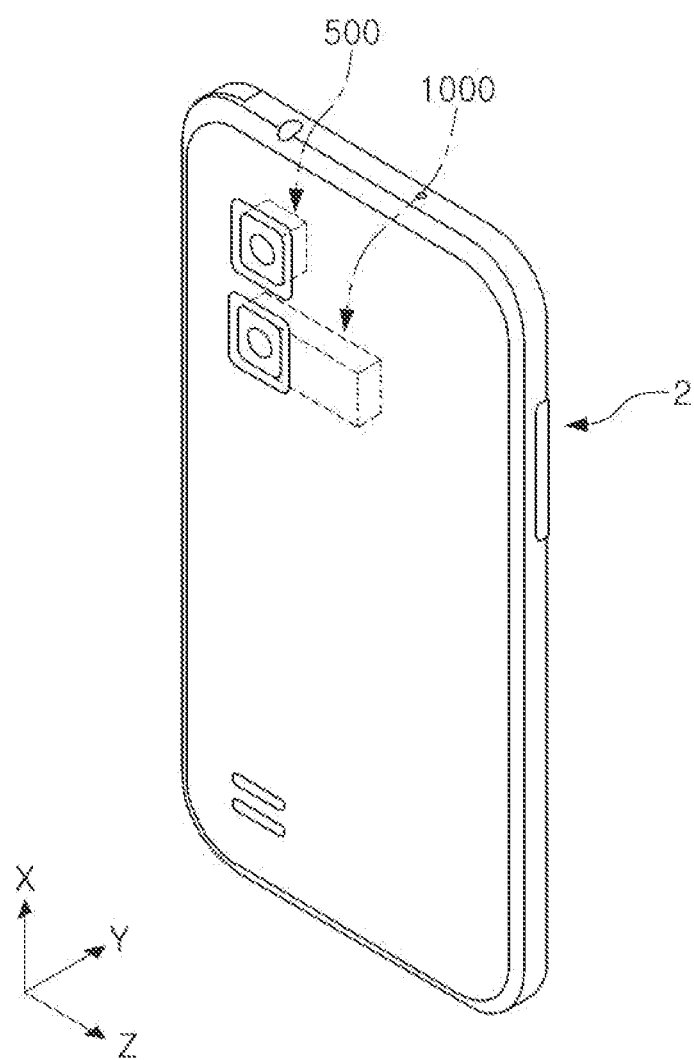
Figure 2:
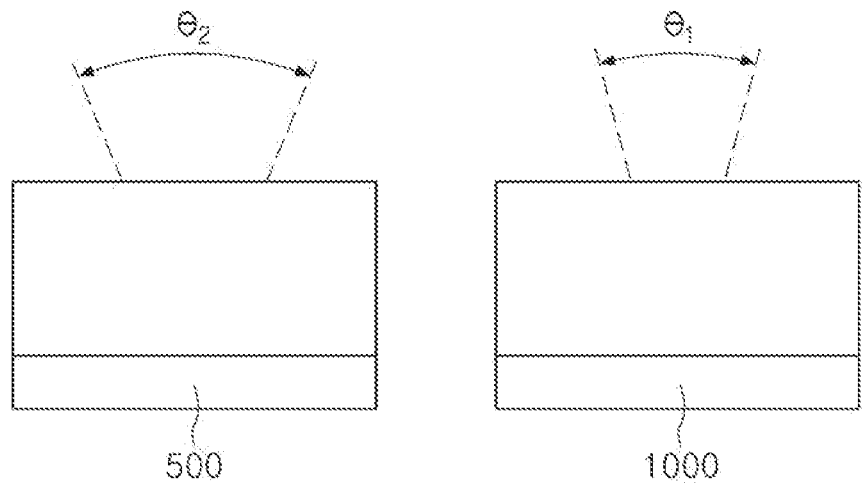
FIG. 2 is a reference diagram illustrating an imaging angle of view of a plurality of camera modules mounted in a portable electronic device according to one or more examples.
Figure 3:
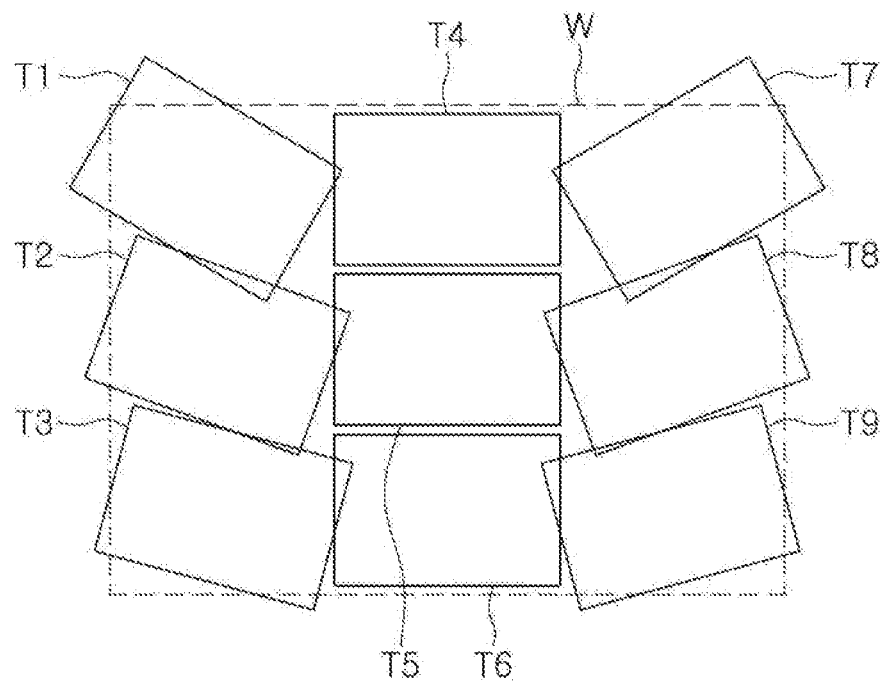
FIG. 3 is a reference diagram illustrating an image display screen of a plurality of camera modules mounted in a portable electronic device according to one or more examples.

FIGS. 1A and 1B are perspective views of portable electronic devices according to one or more examples, and FIG. 2 is a reference diagram illustrating an imaging angle of view of a plurality of camera modules mounted in a portable electronic device according to one or more examples, and FIG. 3 is a reference diagram illustrating an image display screen of a plurality of camera modules mounted in a portable electronic device according to one or more examples.

Portable electronic devices 1 and 2 may be portable electronic devices such as mobile communication terminals, smart phones, and tablet PCs.

As illustrated in FIGS. 1A and 1B, a plurality of camera modules are mounted in the portable electronic devices 1 and 2 to capture a subject. For example, the portable electronic device may include a first camera module 1000 and a second camera module 500.

In each of FIGS. 1A and 1B, two camera modules may be provided. FIG. 1A illustrates a case in which the first camera module 1000 and the second camera module 500 are sequentially disposed in a width direction (a relatively short side direction) of the portable electronic device 1, while FIG. 1B illustrates a case in which the first camera module 1000 and the second camera module 500 are sequentially disposed in a length direction (relatively long side direction) of the portable electronic device 2.

In the case of using two camera modules, entrance ports through which light is incident on the two camera modules may be disposed to be as close to each other as possible.

Further, as illustrated in FIG. 2, the first camera module 1000 and the second camera module 500 are configured to have different angles of view.

The first camera module 1000 is configured with a relatively narrow angle of view (e.g., a telephoto camera), and the second camera module 500 is configured with a relatively wide angle of view (e.g., a wide-angle camera). In this case, the first camera module 1000 may correspond to a camera module described below with reference to FIGS. 4 to 25.

For example, the angle of view θ1 of the first camera module 1000 may be formed in the range of 9° to 35°, and the angle of view θ2 of the second camera module 500 may be formed in the range of 60° to 120°.

By designing different angles of view of the two camera modules as described above, an image of a subject may be imaged at various depths.

On the other hand, the portable electronic devices 1 and 2 according to one or more examples may have a Picture in Picture (PIP) function.

For example, the portable electronic device 1, 2 may display an image captured by a camera module having a relatively narrower field of view (e.g., by the first camera module 1000) in an image captured by a camera module having a relatively wider field of view (e.g., by the second camera module 500).

For example, a subject of interest may be imaged with a narrow angle of view (thus, the subject of interest is enlarged) and may be displayed in an image imaged with a wide angle of view.

When shooting a video, a subject of interest may move, and thus, a camera module having a narrower angle of view (for example, the first camera module 1000) may have a reflection module (folded module) that rotates to capture an image according to the movement of the subject of interest. Accordingly, the light incident on the first camera module 1000 may be reflected by a reflective member of the reflection module so that the light path is changed and then incident on a lens module.

For example, the first camera module 1000 may rotate the reflection module to track the movement of the subject of interest.

For example, the reflection module provided in the first camera module 1000 may be rotated based on a first axis (X axis) and a second axis (Y axis). Accordingly, the first camera module 1000 may correct shake that may occur during imaging.

In this case, the first axis (X axis) means an axis perpendicular to the optical axis (Z axis), and the second axis (Y axis) means an axis perpendicular to both the optical axis (Z axis) and the first axis (X axis). In addition, the first axis (X axis) and the second axis (Y axis), rotation axes of the reflection module of the first camera module 1000, may intersect the optical axis (Z axis); and the optical axis (Z axis), the first axis (X axis) and the second axis (Y axis) may meet at approximately any one point.

FIG. 3 illustrates a range of a subject that may be imaged using the first camera module 1000 and the second camera module 500 installed in the portable electronic devices 1 and 2 according to one or more examples.

The second camera module 500 having a relatively wide field of view is capable of imaging a subject of a relatively large area, and the first camera module 1000 having a relatively narrow field of view may image a subject of a relatively narrow area.

In detail, the first camera module 1000 may image an inner area of a wide imaging range W captured by the second camera module 500, as a teleimaging range T1 to T9, and thus, an image captured as the teleimaging range T1 to T9 may be displayed inside of an image captured as the wide imaging range W. Of course, the teleimaging range T1 to T9 imaged by the first camera module 1000 may overlap a portion of the inner area of the wide imaging range W and an exterior thereof, or may be an outer area of the wide imaging range W.

On the other hand, since the first camera module 1000 includes a reflection module (folded module) that rotates about the first axis (X axis) and the second axis (Y axis) intersecting the optical axis (Z axis), the image captured by the first camera module 1000 may be inclined to an image captured by the second camera module 500 by changing an imaging angle by rotation of the reflection module, which is a case in which the angle of T1 to T3 or T7 to T9 of the teleimaging range illustrated in the reference diagram of FIG. 3 is changed by the rotation of the reflection module.

Accordingly, in the case of an image (video) taken of T1 to T3 or T7 to T9 as a subject, among the teleimaging range taken by the first camera module 1000, the image may be rotated to be aligned with a captured image (video) of the second camera module 500 to implement the PIP function.

To implement these functions, the camera modules 1000 and 500 of the portable electronic devices 1 and 2 may be provided with a control unit for editing an image or implementing a PIP function.

Figure 4:
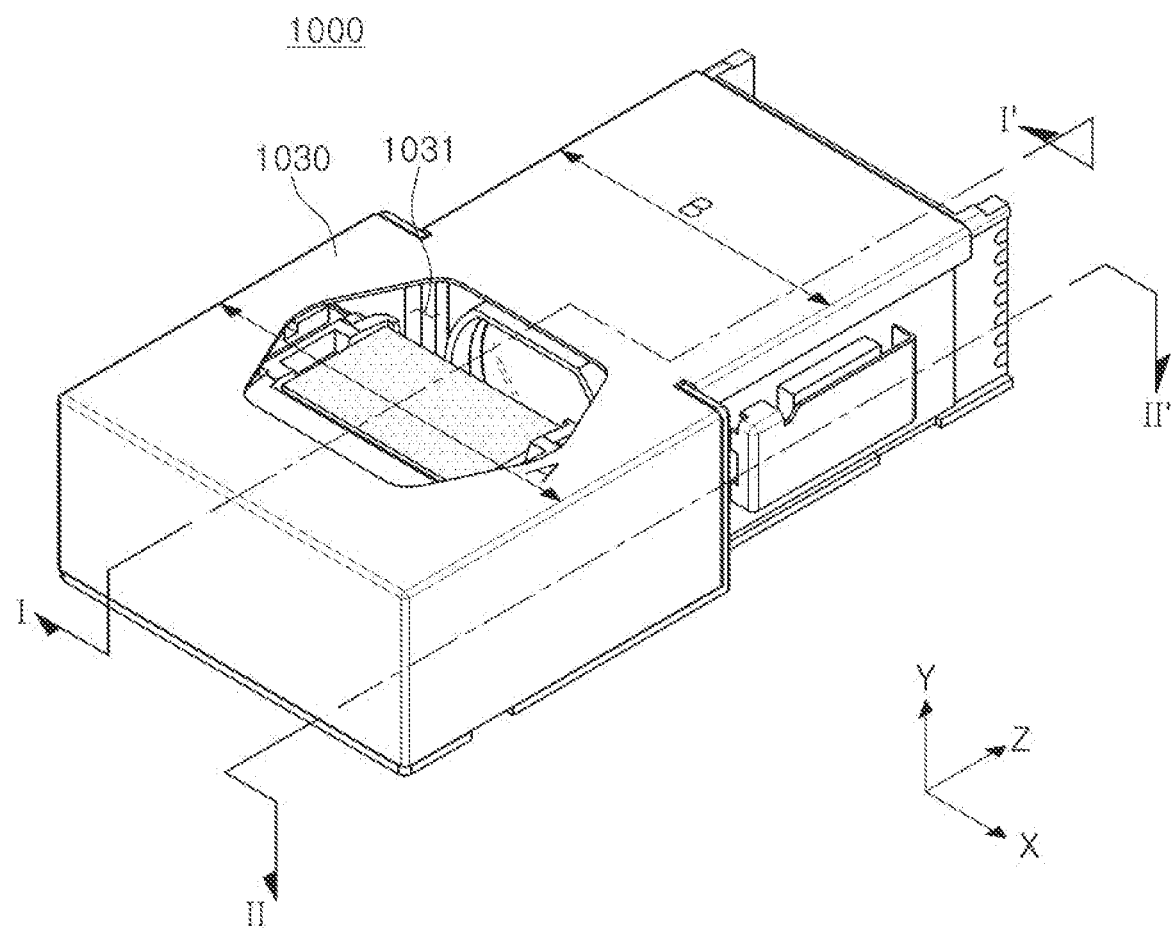
FIG. 4 is a perspective view of a camera module according to one or more examples.
Figure 5A:
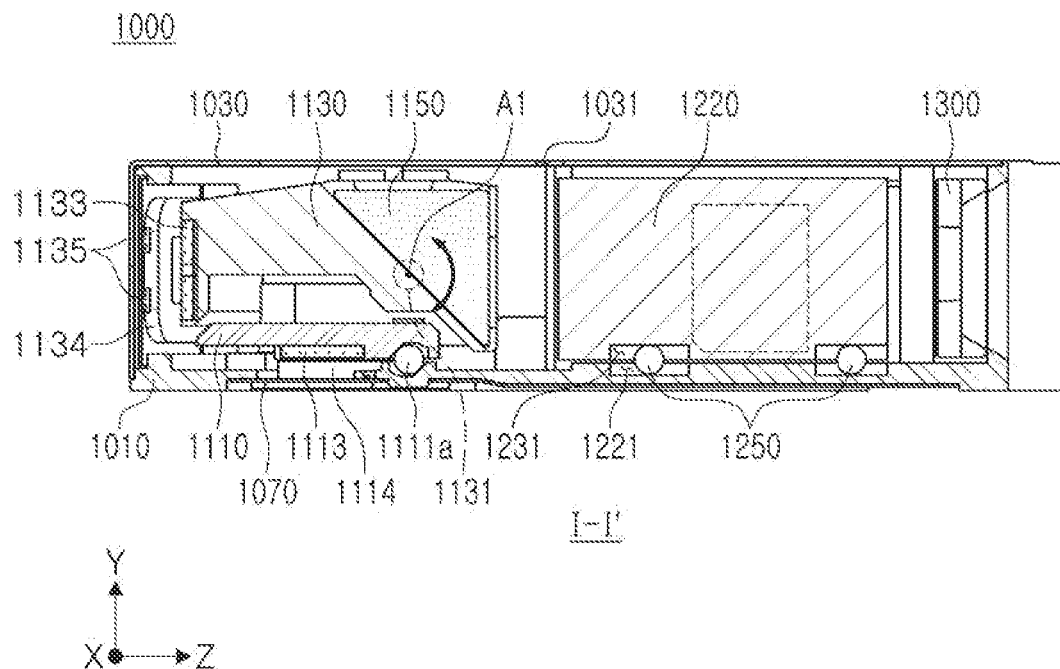
FIGS. 5A and 5B are cross-sectional views of a camera module according to one or more examples.
Figure 5B:
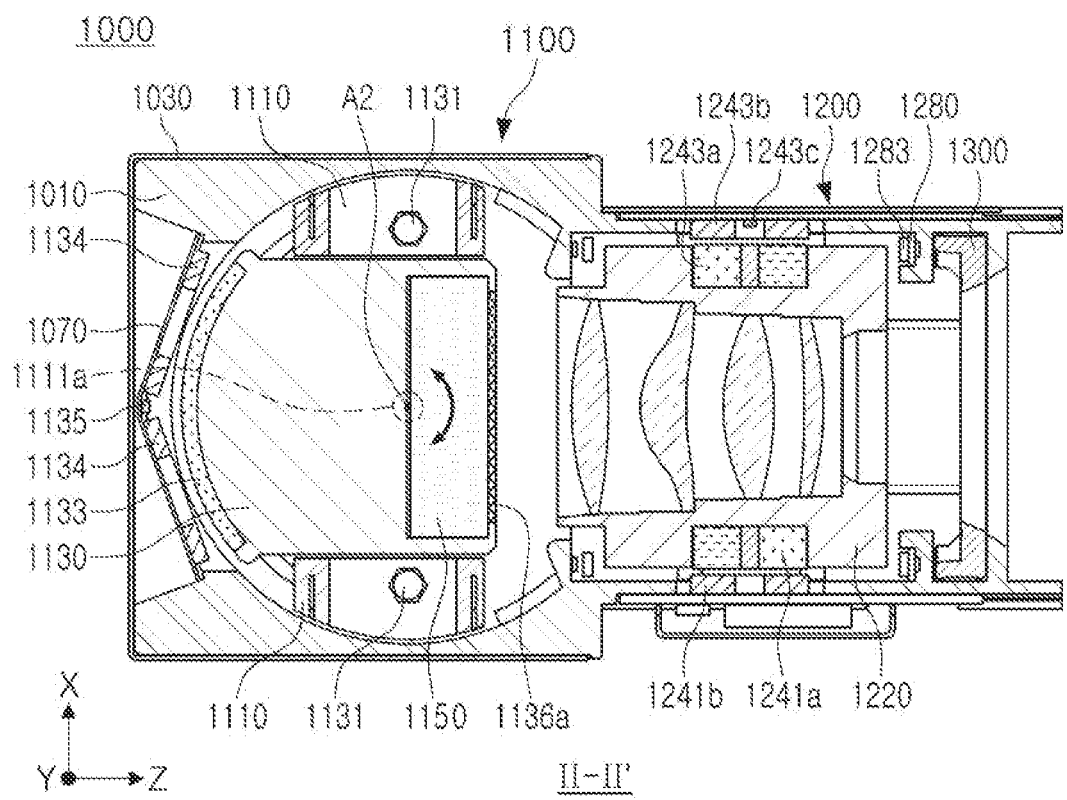
Figure 6:
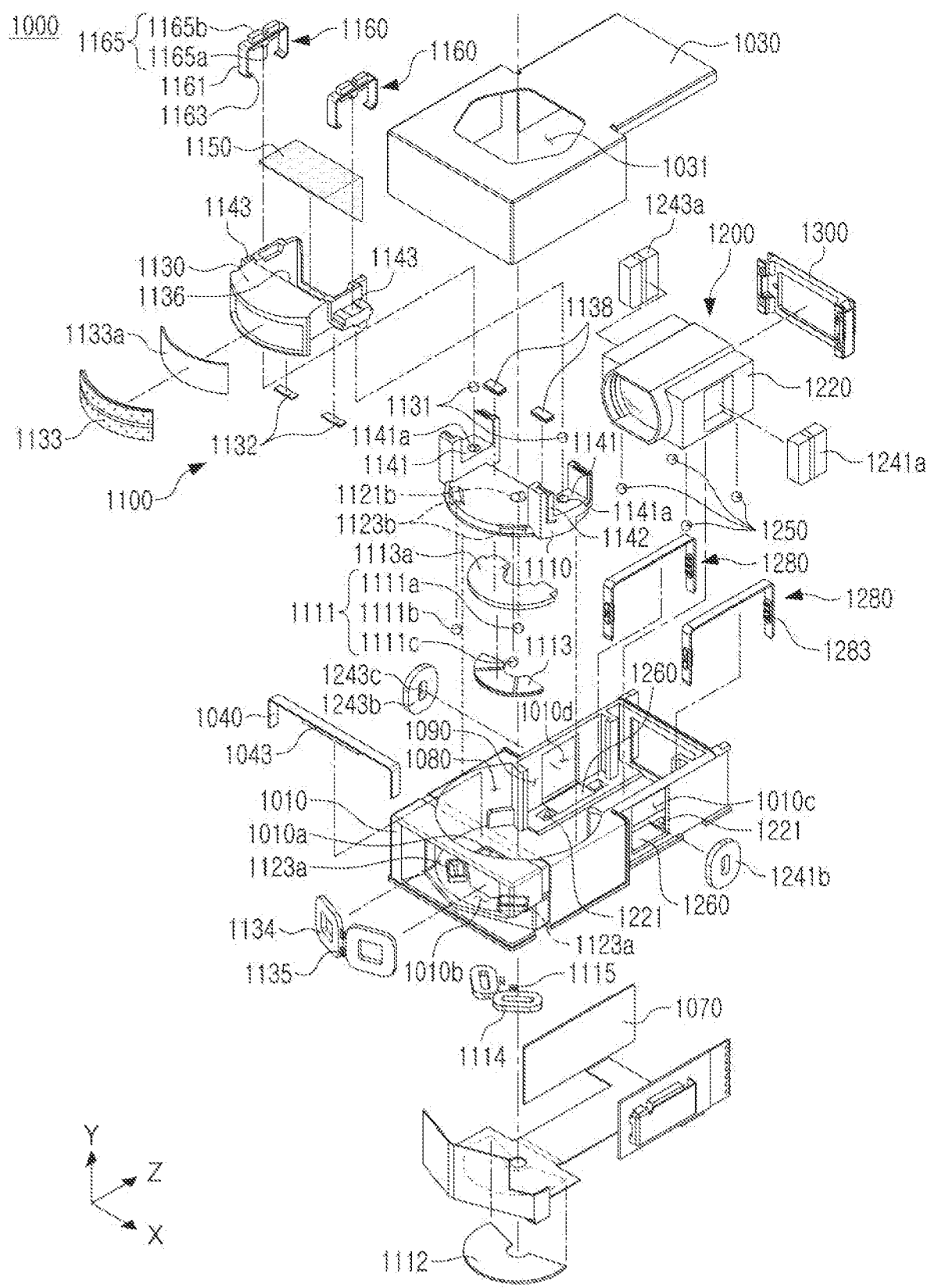
FIG. 6 is an exploded perspective view of a camera module according one or more examples.
Figure 7:
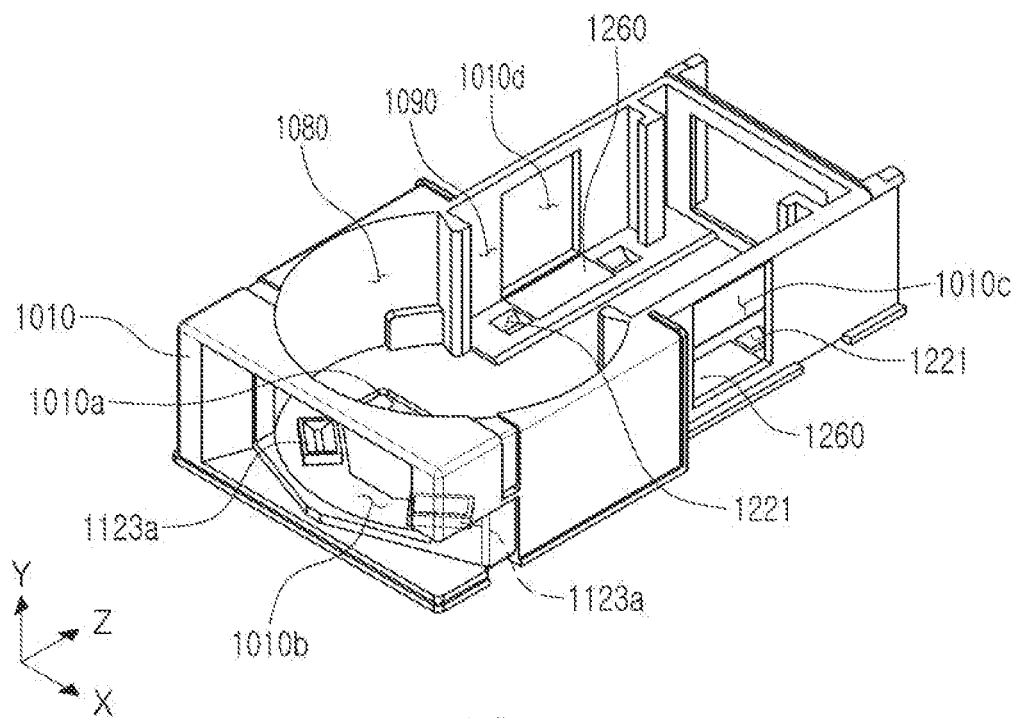
FIG. 7 is a perspective view of a housing of a camera module according to one or more examples.
Figure 8:
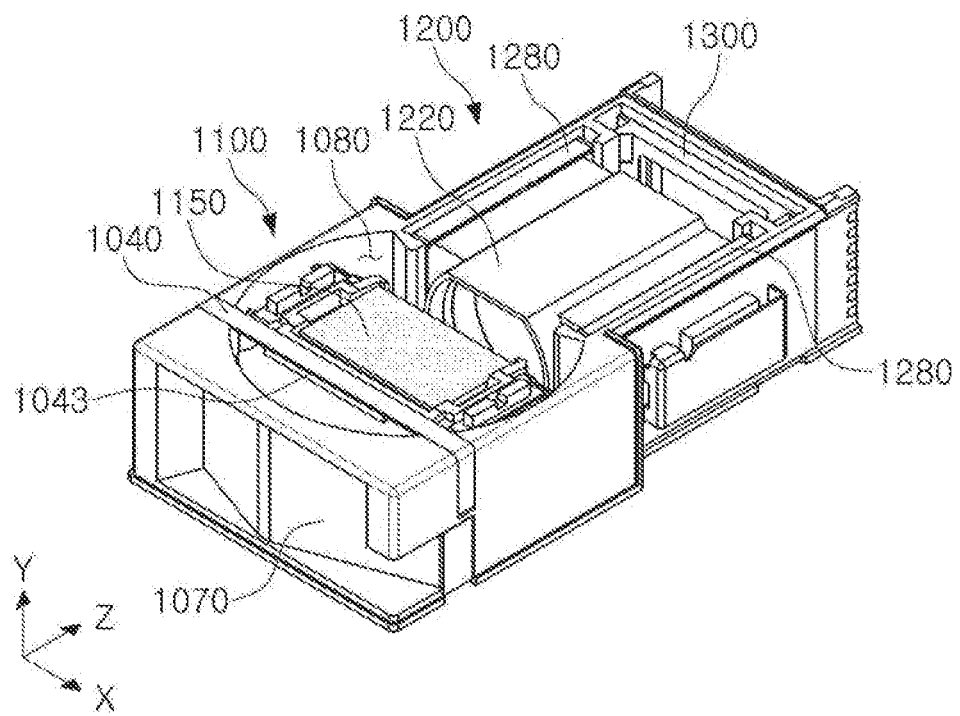
FIG. 8 is a perspective view of a reflection module and a lens module coupled to a housing of a camera module according to one or more examples.

FIG. 4 is a perspective view of a camera module according to one or more examples, FIGS. 5A and 5B are cross-sectional views of a camera module according to one or more examples, and FIG. 6 is an exploded perspective view of a camera module according to one or more examples, FIG. 7 is a perspective view of a housing of a camera module according to one or more examples, and FIG. 8 is a perspective view in which a reflection module and a lens module are combined in a housing of a camera module according to one or more examples.

Referring to FIGS. 4 to 8, a camera module 1000 according to one or more examples includes a reflection module 1100 (folded module) and a lens module 1200 provided in a housing 1010.

The reflection module 1100 is configured to change the traveling direction of light. As an example, the travelling direction of the light incident through an opening 1031 of a cover 1030 (for example, a shield can) covering the camera module 1000 from the top may be changed to be directed toward the lens module 1200 through the reflection module 1100. To this end, the reflection module 1100 may include a reflective member 1150 reflecting light.

The reflective member 1150 may include a chamfer 1153 in which a corner of the reflective member 1150 is cut to reduce light reflection or scattering.

The path of light incident in the thickness direction (Y-axis direction) of the camera module 1000 is changed by the reflection module 1100 to substantially coincide with the optical axis (Z-axis) direction.

To this end, the reflection module 1100 includes the reflective member 1150 reflecting light. Then, the light incident on the lens module 1200 may be converted into an electric signal by an image sensor (not illustrated) after passing through the plurality of lenses and then be stored.

The lens module 1200 includes a plurality of lenses through which light whose traveling direction has been changed by the reflection module 1100 passes. In addition, the lens module 1200 includes at least one lens barrel. Autofocusing (AF) or a zoom function may be implemented by the movement of at least one lens barrel in the optical axis direction (Z-axis).

An image sensor module (not illustrated) may include an image sensor (not illustrated) for converting light passing through a plurality of lenses into electric signals, and a printed circuit board (not illustrated) on which the image sensor is mounted.

In an internal space of the housing 1010, the reflection module 1100 is provided in front of the lens module 1200, centered on the lens module 1200, and the image sensor module (not illustrated) is provided at the rear of the lens module 1200.

In addition, a baffle 1300 may be provided at the rear of the lens module 1200 in the housing 1010 to block unnecessary light that may flow toward the image sensor, to reduce flare. In the drawing, only one baffle 1300 is illustrated, but two or more baffles 1300 may also be provided.

To implement a telephoto camera, the focal length may be increased, and accordingly, the distance between the lens module 1200 and the image sensor may be increased.

Accordingly, the baffle 1300 may be provided to block unnecessary light in an internal optical path of the housing 1010. The baffle 1300 is a member fitted into the inner space of the housing 1010, and may reduce the size of the optical path so that excessive reflection does not occur when light passes through the inner space of the housing 1010.

The reflection module 1100 and the lens module 1200 are sequentially provided from one side to the other side in the housing 1010.

For example, as illustrated in the drawing, the housing 1010 may be integrally provided so that both the reflection module 1100 and the lens module 1200 are inserted into the inner space thereof.

By using the integrated housing 1010, there is no need to separately align the optical axes of the reflection module 1100 and the lens module 1200, and since the housing is provided as one, the number of components may be reduced, and thus assembly may be very easy.

However, examples of the present disclosure are not limited thereto, and for example, separate housings into which the reflection module 1100 and the lens module 1200 are inserted respectively may be interconnected.

In this embodiment, the reflective member 1150 provided in the reflection module 1100 may have a rotation angle of approximately ±10 degrees with respect to the first axis (X-axis) (a total of 20 degrees may be rotated), and a rotation angle of approximately ±25 degrees with respect to the second axis (Y-axis) (a total of 50 degrees may be rotated), and for example, may rotate in a fairly large range.

Accordingly, a space in the housing 1010 in which the reflection module 1100 is provided may have a greater width, for example, a greater length in the X-axis direction, than that of a space in which the lens module 1200 is provided.

For example, in the housing 1010, the width of the space in which the reflection module 1100 is provided (length in the X-axis direction) is referred to as 'A', and the width of the space in which the lens module 1200 is provided (the length in the X-axis direction) is referred to 'B', the relationship of '2>A/B>1' may be satisfied.

The light whose path is changed by the reflection module 1100 is incident on the lens module 1200. Therefore, a plurality of lenses provided in the lens module 1200 are provided to be stacked in a Z-axis direction, which is a direction in which light is emitted from the reflection module 1100.

In addition, the lens module 1200 includes a third driving unit to implement autofocusing (AF) and zoom functions.

The lens module 1200 includes a lens holder 1220 provided in a second space 1090 of the housing 1010 and including a stacked lens therein, and a third driving unit for moving the lens holder 1220.

The lens holder 1220 accommodates a plurality of lenses for imaging a subject, and the plurality of lenses are mounted in the lens holder 1220 along an optical axis. The lens holder 1220 may separately include a lens barrel in which a plurality of lenses are stacked, and a carrier surrounding the lens barrel. Alternatively, a plurality of lenses may be stacked in the lens holder 1220 itself.

The lens holder 1220 is configured to move in the direction of the optical axis (Z axis) to implement an autofocusing or zoom function.

The third driving unit generates driving force so that the lens holder 1220 may move in the optical axis (Z axis) direction. For example, the third driving unit may move the lens holder 1220 to change the distance between the lens holder 1220 and the reflection module 1100.

For example, the third driving unit includes a plurality of third magnets 1241*a* and 1243*a* and a plurality of third coils 1241*b* and 1243*b* disposed to face the plurality of third magnets 1241*a* and 1243*a*.

When power is applied to the plurality of third coils 1241*b* and 1243*b*, the lens holder 1220 on which the plurality of third magnets 1241*a* and 1243*a* are mounted may be moved in the direction of the optical axis (Z axis) by an electromagnetic influence between the plurality of third magnets 1241*a* and 1243*a* and the plurality of third coils 1241*b* and 1243*b*.

The plurality of third magnets 1241*a* and 1243*a* are mounted in the lens holder 1220. For example, the plurality of third magnets 1241*a* and 1243*a* may be mounted on the side of the lens holder 1220.

The plurality of third coils 1241*b* and 1243*b* are mounted in the housing 1010. For example, a main substrate 1070 may be mounted in the housing 1010 in a state in which the plurality of third coils 1241*b* and 1243*b* are mounted on the main substrate 1070.

In this case, for convenience of explanation, in the drawing, both a coil for the reflection module 1100 and a coil for the lens module 1200 are mounted on the main substrate 1070, but the configuration is not limited thereto, and the main substrate 1070 may be provided as separate substrates on which the coil for the reflection module 1100 and the coil for the lens module 1200 are mounted respectively.

In this embodiment, when the lens holder 1220 is moved, a closed loop control method in which the position of the lens holder 1220 is sensed and fed back is used. Therefore, a third position detection sensor 1243*c* is required for closed loop control. The third position detection sensor 1243*c* may be a Hall sensor.

The third position detection sensor 1243*c* is disposed inside or outside of at least one third coil 1243*b*, and the third position detection sensor 1243*c* may be mounted on the main substrate 1070 on which the third coil 1243*b* is mounted.

The lens holder 1220 is provided in the housing 1010 to be movable in the optical axis (Z axis) direction. For example, a plurality of third ball members 1250 are disposed between the lens holder 1220 and the housing 1010.

The plurality of third ball members 1250 serve as bearings that guide the movement of the lens holder 1220, and also function to maintain a gap between the lens holder 1220 and the housing 1010.

The plurality of third ball members 1250 are configured to roll or slide in the optical axis (Z axis) direction when driving force is generated in the optical axis (Z axis) direction. Accordingly, the plurality of third ball members 1250 guide the movement of the lens holder 1220 in the optical axis (Z axis) direction.

A plurality of seventh guide portions 1221 and 1231 accommodating the plurality of third ball members 1250 are formed on at least one of surfaces of the lens holder 1220 and the housing 1010, facing each other.

The plurality of third ball members 1250 are accommodated in the plurality of seventh guide portions 1221 and 1231 and are fitted between the lens holder 1220 and the housing 1010.

The plurality of seventh guide portions 1221 and 1231 may have a shape having a length in the optical axis (Z axis) direction.

The plurality of third ball members 1250 are restricted in movement in the X-axis and Y-axis directions perpendicular to the optical axis in the state of being accommodated in the plurality of seventh guide portions 1221, 1231 and only move in the optical axis (Z-axis) direction. For example, the plurality of third ball members 1250 may only roll in the optical axis (Z axis) direction.

To this end, the plurality of seventh guide portions 1221, 1231 may respectively be formed in a shape elongated in the optical axis (Z axis) direction. In addition, cross-sections of the plurality of seventh guide portions 1221 may have various shapes such as a curved shape or a polygonal shape.

In this case, the lens holder 1220 is pressed toward the housing 1010 so that the plurality of third ball members 1250 may maintain contact thereof with the lens holder 1220 and the housing 1010.

To this end, a third yoke 1260 may be mounted on the bottom surface of the housing 1010 to face the plurality of third magnets 1241*a* and 1243*a* mounted in the lens holder 1220. The third yoke 1260 may be a magnetic material.

Attractive force acts between the third yoke 1260 and the plurality of third magnets 1241*a* and 1243*a*. Accordingly, the lens holder 1220 may be moved in the optical axis (Z axis) direction by the driving force of the third driving unit in a state in contact with the plurality of third ball members 1250.

The lens holder 1220 is supported by the housing 1010 by the attractive force of the third yoke 1260 and the plurality of third magnets 1241*a* and 1243*a*, but accordingly, the lens holder 1220 may be separated by an external force such as external impacts or the like to collide with other members such as the cover 1030 or the like.

Accordingly, in an example of the present disclosure, a third auxiliary member 1280 may be provided to prevent the lens holder 1220 from being displaced and to absorb an impact even in the case in which shaking by an external force occurs.

The third auxiliary member 1280 serves as a stopper or damper, is provided in an approximately ' E' shape, and both ends thereof may be fitted and fixed to the housing 1010 to cover the lens holder 1220 from the top.

The third auxiliary member 1280 may additionally include a damping member formed of an elastic material on various portions thereof to absorb shock. For example, in the process of moving the lens holder 1220 in the optical axis direction, the front end or the rear end of the lens holder 1220 in the optical axis direction may contact the third auxiliary member 1280, and in this case, both ends of the third auxiliary member 1280 may be provided with a damper 1283.

The third auxiliary member 1280 may be provided as two third auxiliary members to be installed on both sides of the lens holder 1220, respectively.

The housing 1010 is covered by the cover 1030.

The cover 1030 has an opening 1031 so that light is incident therein, and the light incident through the opening 1031 is changed in a traveling direction by the reflection module 1100 so that the light enters the lens module 1200. The cover 1030 may be integrally provided to cover the entire housing 1010, or may be divided into separate members covering the reflection module 1100 and the lens module 1200, respectively.

The opening 1031 provided in the cover 1030 may be provided in a substantially hexagonal shape. The reflection module 1100, according to the present embodiment, is capable of relatively large rotation based on the second axis (Y axis), and accordingly, when the reflective member 1150 is rotated to the maximum, based on the second axis (Y-axis), a short edge of the reflective member 1150 and the side of the cover 1030 may be disposed substantially parallel to each other.

Referring further to FIG. 7, the housing 1010 includes the reflection module 1100 and the lens module 1200 in an internal space. Accordingly, the internal space of the housing 1010 may be divided into a first space 1080 in which the reflection module 1100 is disposed and a second space 1090 in which the lens module 1200 is disposed.

The first space 1080 in which the reflection module 1100 is disposed in the housing 1010 may be provided so that the inner space has a rounded shape, such that a carrier 1110 rotating relatively widely may be easily rotated.

Further, since the plurality of coils 1114, 1134, 1241b, and 1243b are provided in the housing 1010 while being mounted on the main substrate 1070, a plurality of through-holes 1010a, 1010b, 1010c, and 1010d may be provided in the housing 1010 in such a manner that the plurality of coils 1114, 1134, 1241b, and 1243b are exposed to the inner space of the housing 1010.

Figure 9:
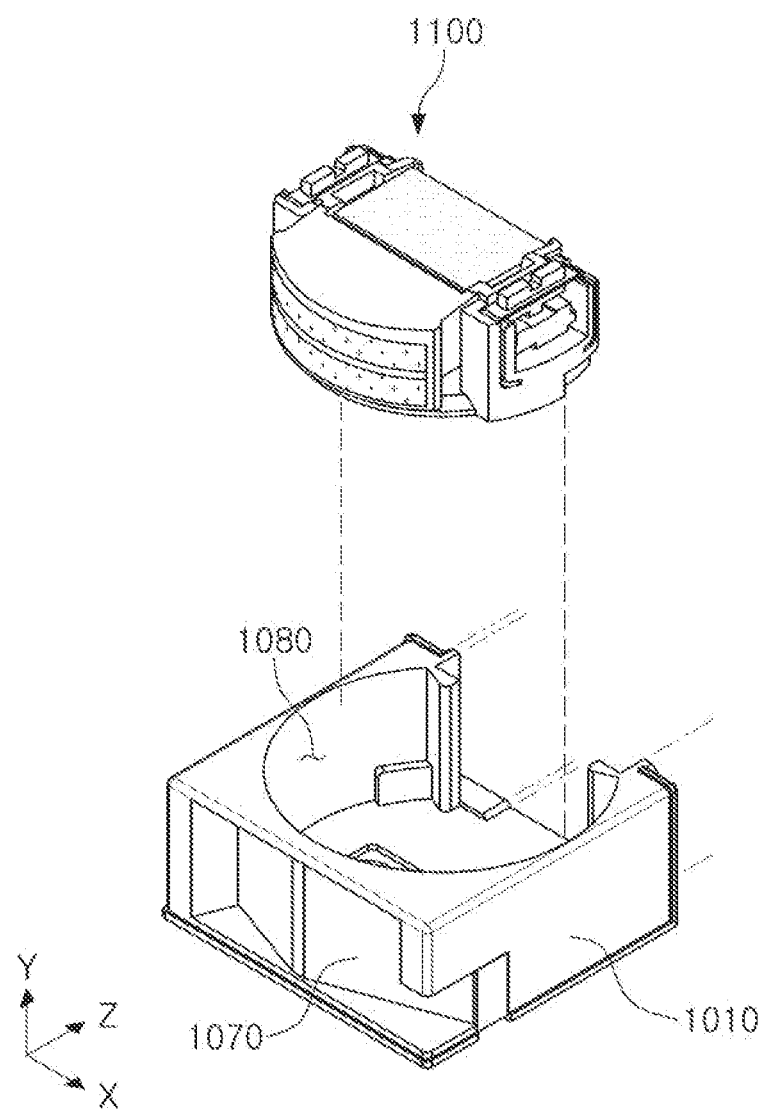
FIG. 9 is an exploded perspective view of a housing and a reflection module of a camera module according to one or more examples.
Figure 10A:
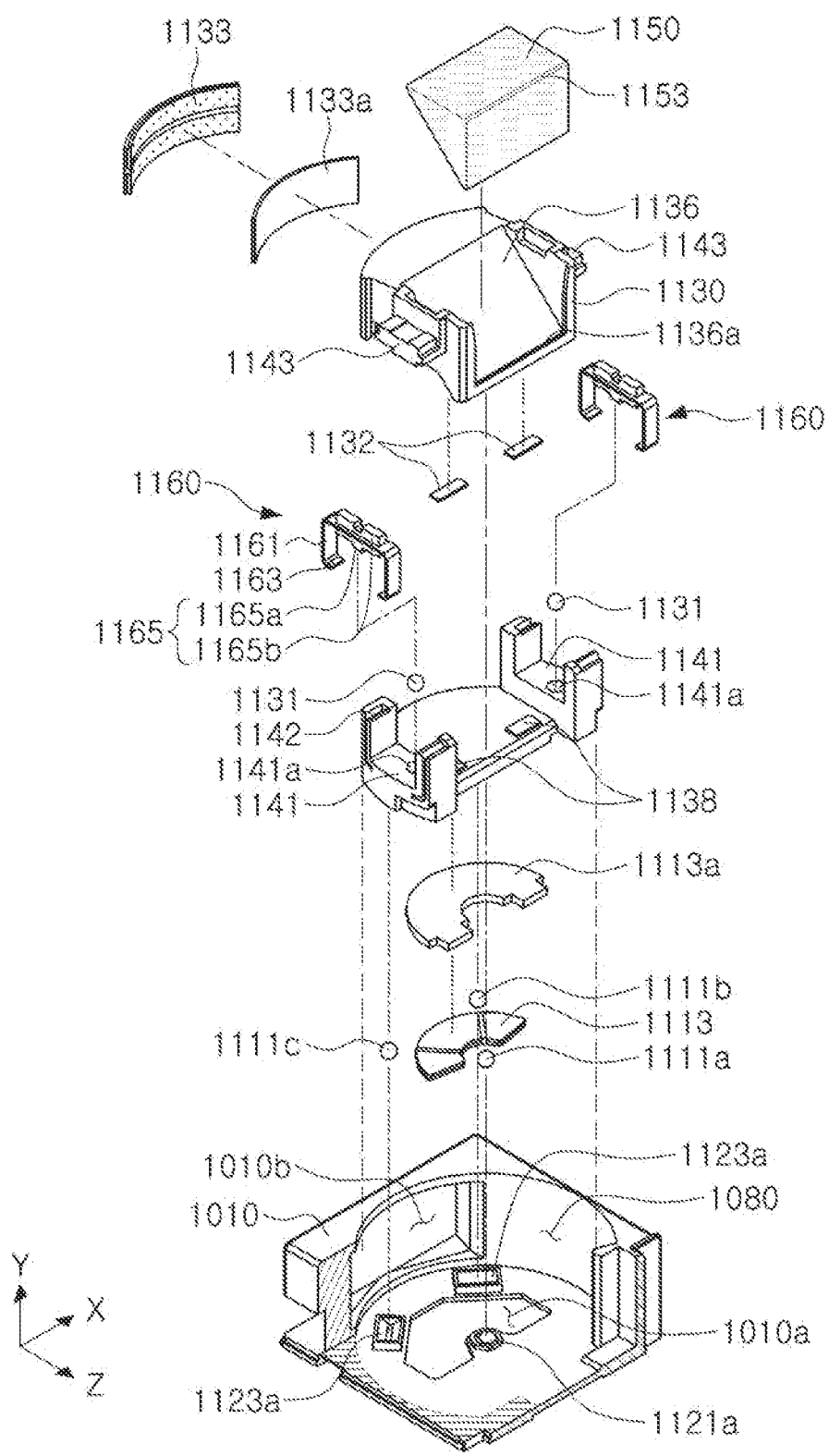
FIG. 10A is a detailed upper exploded perspective view of a housing and a reflection module of a camera module according to one or more examples.
Figure 10B:
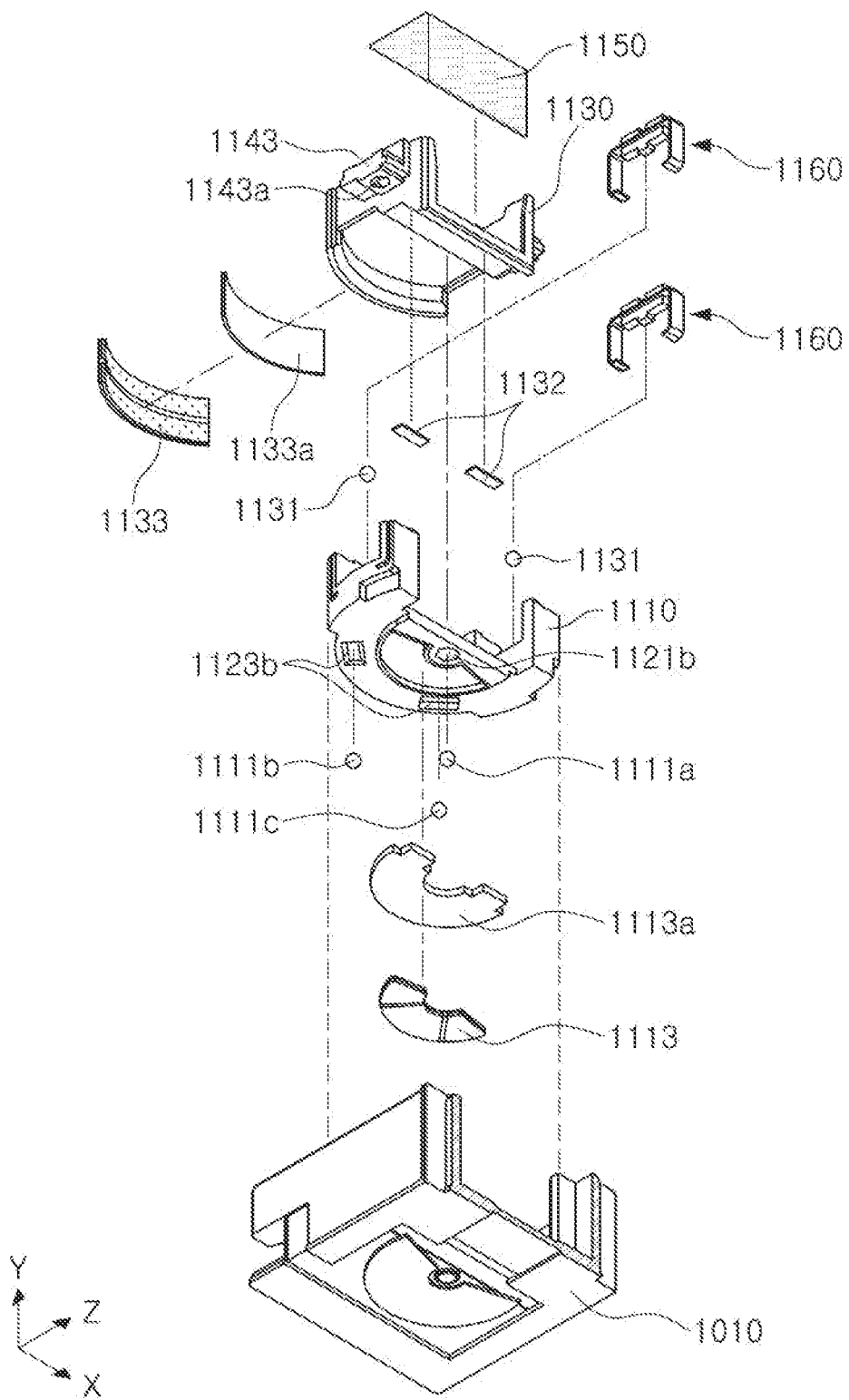
FIG. 10B is a detailed lower exploded perspective view of a housing and a reflection module of a camera module according to one or more examples.

FIG. 9 is an exploded perspective view of a housing and a reflection module of a camera module according to one or more examples, and FIG. 10A is a detailed upper exploded perspective view of a housing and a reflection module of a camera module according to one or more examples, and FIG. 10B is a detailed lower exploded perspective view of a housing and a reflection module of a camera module according to one or more examples.

Referring further to FIGS. 9 to 10B, the reflection module 1100 includes the carrier 1110 provided in the housing 1010 and a rotation holder 1130 provided in the carrier 1110.

The carrier 1110 rotates with respect to the housing 1010 about a second axis A2 (an axis parallel to the Y axis), and the rotation holder 1130 rotates with respect to the carrier 1110 about a first axis A1 (an axis parallel to the X axis).

Referring further to FIGS. 14 to 19, the carrier 1110 is provided in the first space 1080 of the housing 1010. The carrier 1110 is closely supported with a first ball member 1111 sandwiched between the bottom surface of the housing 1010 and the carrier 1110, and the carrier 1110 is rotationally driven by a first driving unit. At least a portion of the first space 1080 may be provided in a rounded shape to facilitate a relatively large rotation of the carrier 1110. In more detail, at least a portion of the inner surface of the first space 1080 may be provided to correspond to an arc shape of a circle centered on the second axis A2.

In addition, the carrier 1110 may be provided such that at least a portion thereof has a rounded shape, to facilitate the relatively large rotation thereof in the first space 1080. In further detail, at least a portion of the carrier 1110 may be provided corresponding to the arc shape of a circle centered on the second axis A2.

Further, the rotation holder 1130 mounted on the carrier 1110 may be provided such that at least a portion thereof has a rounded shape, to facilitate the relatively large rotation in the first space 1080. More specifically, at least a portion of the rotation holder 1130 may be provided to correspond to the arc shape of a circle centered on the second axis A2.

The first driving unit includes a first magnet 1113 and a first coil 1114.

Accordingly, a first yoke 1112 is provided on the bottom surface of the housing 1010, and the first yoke 1112 enables the carrier 1110 to be in close contact with the bottom surface of the housing 1010 by attraction force with the first magnet 1113 provided in the carrier 1110.

At least three first ball members (1111) 1111a, 1111b, and 1111c may be provided between the bottom surface of the housing 1010 and the carrier 1110.

One of the three first ball members, a rotating shaft ball 1111a, forms the second axis A2 (an axis parallel to the Y-axis), which is a rotation axis in which the carrier 1110 rotates with respect to the housing 1010, and the other ball members, guide balls 1111b and 1111c may help to facilitate rotation of the carrier 1110.

In this case, the second axis A2 may be perpendicular to a plane including a triangle connecting the three first ball members (1111) 1111a, 1111b, and 1111c.

Since the rotating shaft ball 1111a should form a rotating shaft, the position is not changed and the rotating shaft ball may be rotated or fixed in place by itself while being fixed in one place. Accordingly, the carrier 1110 may rotate about the rotating shaft ball 1111a.

The guide balls 1111b and 1111c are provided on a position other than the rotation axis, to guide the rotation of the carrier 1110, and thus may be provided to roll or slide. Accordingly, the movement of the carrier 1110 may be guided by the rolling or sliding of the guide balls 1111b and 1111c.

Accordingly, a guide portion or the like into which the rotating shaft ball 1111a is inserted is provided on the bottom surface of the housing 1010 and the lower surface of the carrier 1110.

A first guide portion 1121a may be provided in the housing 1010 such that the rotating shaft ball 1111a is inserted, and a second guide portion 1121b may be provided in the carrier 1110. Since the rotating shaft ball 1111*a* having a spherical shape should not be moved in position, at least one of the first guide portion 1121*a* and the second guide portion 1121*b* may be supported by at least three points with the rotating shaft ball 1111*a*.

Figure 16A:
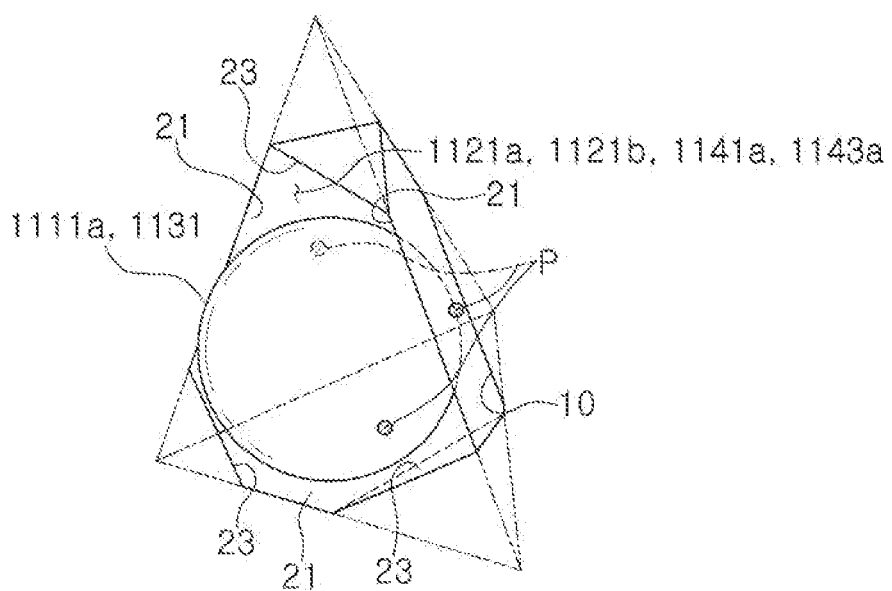
FIGS. 16A and 16B are reference diagrams illustrating an example in which a ball member of a camera module, according to one or more examples, is fixed to a guide portion to be supported by three points.
Figure 16B:
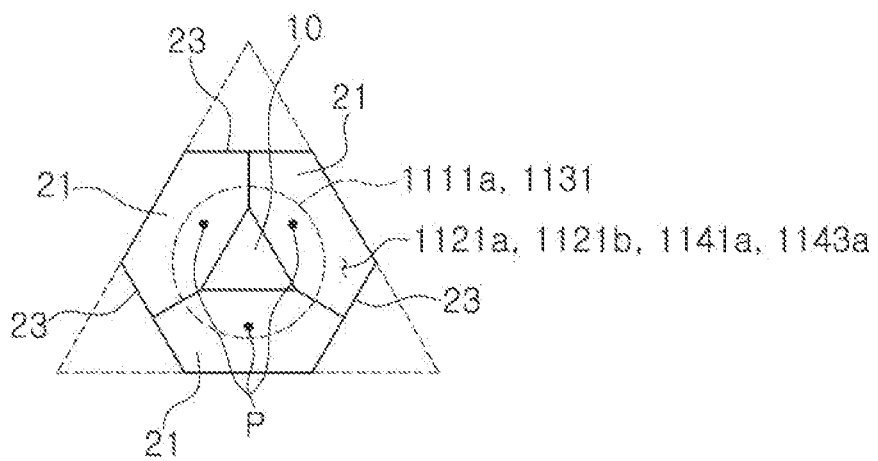

For example, the first guide portion 1121*a* and the second guide portion 1121*b* may be provided in a shape in which each corner is cut in a triangular pyramid (tetrahedral) shape as illustrated in FIGS. 16A and 16B, which will be described later.

Alternatively, the rotating shaft ball 1111*a* may be fixedly provided to one of the housing 1010 or the carrier 1110, and the guide portion that is not moved in position is provided in the other of the housing 1010 or the carrier 1110.

Third guide portions 1123*a* may be provided in the housing 1010 and fourth guide portions 1123*b* may be provided in the carrier 1110, such that the guide balls 1111*b* and 1111*c* are inserted. Since the spherical guide balls 1111*b* and 1111*c* are preferably moved in position, the third guide portion 1123*a* and the fourth guide portion 1123*b* may be provided to be elongated in the rotation direction of the carrier 1110.

In this embodiment, the third guide portion 1123*a* and the fourth guide portion 1123*b* may be provided in a straight line shape in the rotation direction.

In the case in which the third guide portion 1123*a* and the fourth guide portion 1123*b* are provided in a straight line shape, one of the third guide portion 1123*a* and the fourth guide portion 1123*b* may be provided to have an additional degree of freedom. This is because the guide balls 1111*b* and 1111*c* support the rotating carrier 1110, and thus, if configured to be only moved in a straight direction, the guide may not be properly performed.

Figure 17A:
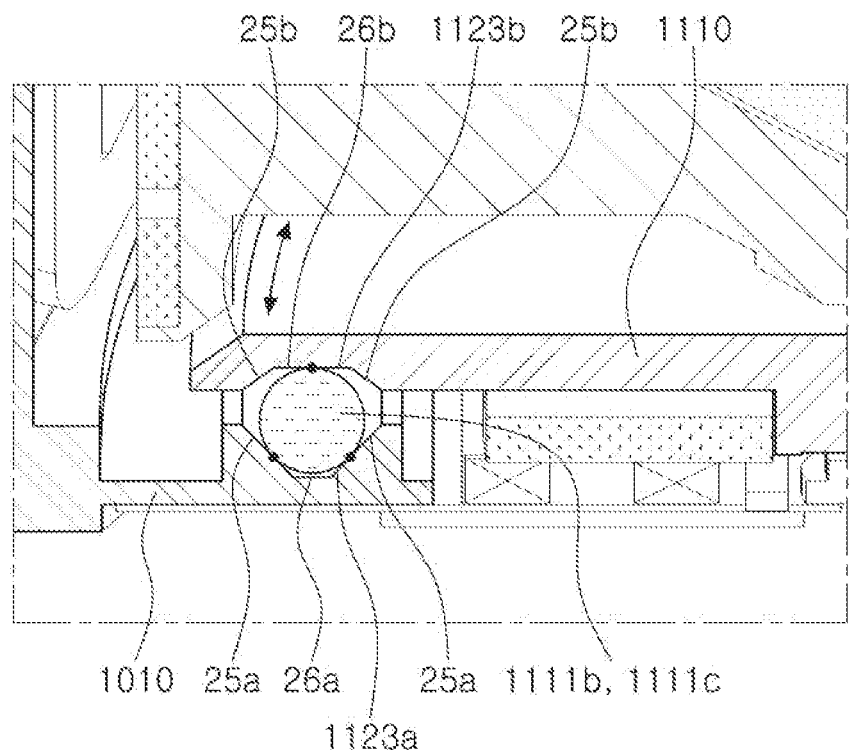
FIGS. 17A and 17B are excerpt cross-sectional views of a state in which a carrier is coupled to a housing of a camera module according to one or more examples.
Figure 17B:
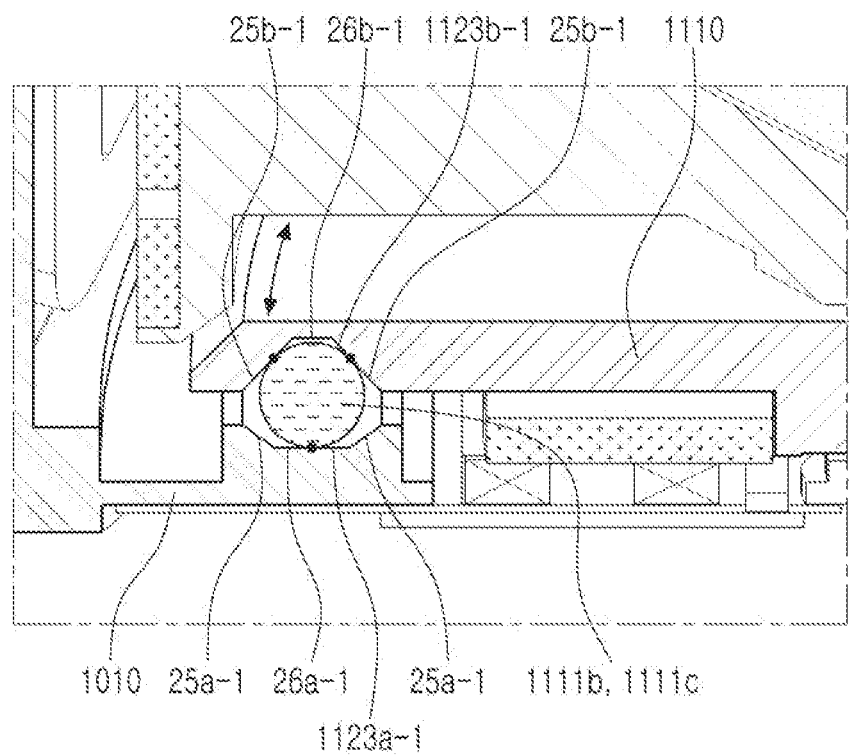

For example, among the third guide portion 1123*a* and the fourth guide portion 1123*b*, as illustrated in FIGS. 17A and 17B, respectively, selectively, one is supported by at least two points, including a side surface of a 'V-shaped' or 'U-shaped' groove, by the guide balls 1111*b* and 1111*c*, and the other is supported by one point on a substantially flat bottom surface by the guide ball 1111*b*, 1111*c*, not contacting the side surface of the groove.

Accordingly, there is no restraint on the side surface inside of the guide portion that does not contact the side of the groove, and is supported only by one point on the bottom surface, and thus, the ball may move left and right along the bottom surface, thereby providing an additional degree of freedom. Therefore, even when the carrier 1110 rotates, the rolling of the guide balls 1111*b* and 1111*c* may be relatively smooth.

Referring to FIG. 17A, a rotating portion 1110 which rotates relative to a fixed portion 1010 with respect to a rotation axis may be guided by the guide balls 1111*b* and 1111*c*. The guide balls 1111*b* and 1111*c* may include a third guide portion 1123*a* and a fourth guide portion 1123*b* that are provided in a straight line substantially in a rotational direction. In this case, the third guide portion 1123*a* provided in the housing that is the fixed portion 1010 has a bottom surface 26*a* and both side surfaces 25*a*, and the guide balls 1111*b* and 1111*c* may be supported by at least two points on both side surfaces 25*a* (may also be supported up to the bottom surface 26*a*).

In addition, the fourth guide portion 1123*b* provided in the carrier, which is the rotating portion 1110, has a bottom surface 26*b* and both side surfaces 25*b*, and the guide balls 1111*b* and 1111*c* are by one point on the bottom surface 26*a*. When the guide balls 1111*b* and 1111*c* come into contact with one of the side surfaces 25*b*, the guide balls 1111*b* and 1111*c* are no longer able to roll over, and thus, both side surfaces 25*b* may serve as stoppers.

In this manner, the guide balls 1111*b* and 1111*c* are supported by at least two points in the third guide portion 1123*a* provided in the fixed portion 1010 to move linearly along a predetermined path of the guide portion, and are supported by one point on the bottom surface in the fourth guide portion 1123*b* provided in the rotating portion 1110. The guide balls 1111*b* and 1111*c* supported by one point form a curved moving path on the bottom surface 26*b* of the guide portion of the rotating portion 1110 according to the movement of the carrier, which is the rotating portion 1110.

In addition, referring to FIG. 17B, the rotating portion 1110 which rotates relative to the fixed portion 1010 with respect to the rotation axis may be guided by the guide balls 1111*b* and 1111*c*. The guide balls 1111*b* and 1111*c* may include a third guide portion 1123*a*-1 and a fourth guide portion 1123*b*-1, provided in a straight line in the rotation direction.

In this case, the third guide portion 1123*a*-1 provided in the housing, which is the fixed portion 1010, has a bottom surface 26*a*-1 and both side surfaces 25*a*-1, and the guide balls 1111*b* and 1111*c* are supported by one point on the bottom surface 26*a*-1. When the guide balls 1111*b* and 1111*c* come into contact with either of both side surfaces 25*a*-1, the guide balls 1111*b* and 1111*c* cannot rolling move any more, and thus, both side surfaces 25*a*-1 may function as stoppers. In addition, the fourth guide portion 1123*b*-1 provided in the carrier, which is the rotating portion 1110, has a bottom surface 26*b*-1 and both side surfaces 25*b*-1, and the guide balls 1111*b* and 1111*c* may be supported by at least two points on both side surfaces 25*b*-1 (may also be supported up to the bottom surface 26*b*-1).

In this manner, the guide balls 1111*b* and 1111*c* are supported by at least two points in the fourth guide portion 1123*b*-1 provided in the rotating portion 1110 to move linearly along a predetermined path of the guide portion, and are supported by one point on the bottom surface in the third guide portion 11231-1 provided in the fixed portion 1010, and the one point supported guide balls 1111*b* and 1111*c* form a curved path on the bottom surface 26*a*-1 of the guide portion of the fixed portion 1010 according to the movement of the carrier, which is the rotating portion 1110.

Figure 18:
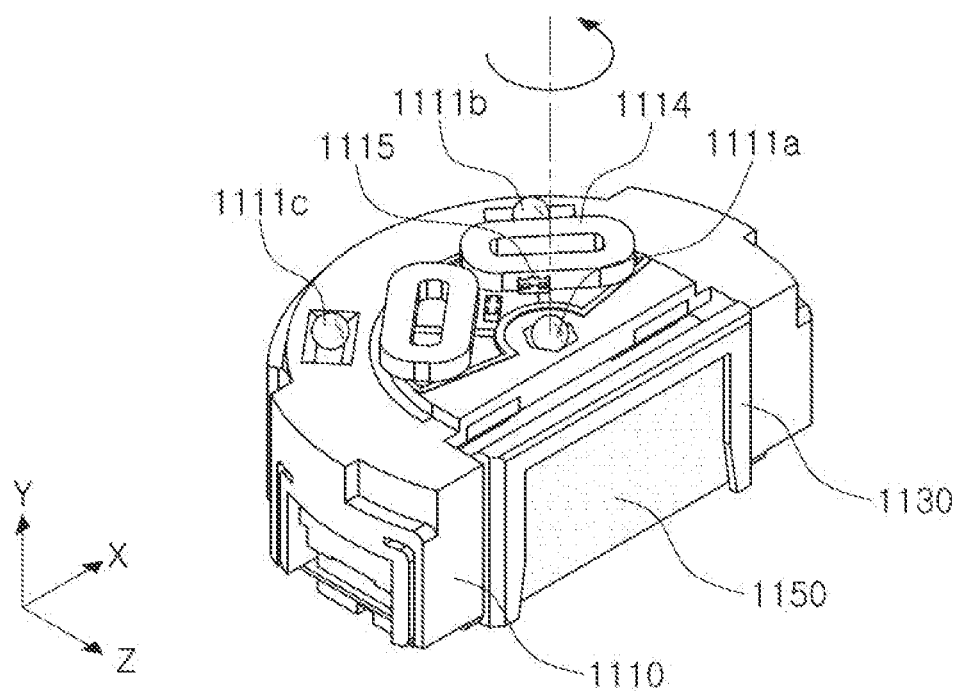
FIG. 18 is a bottom perspective view for schematically illustrating a state in which a carrier rotates relative to a housing in a camera module according to one or more examples.
Figure 19:
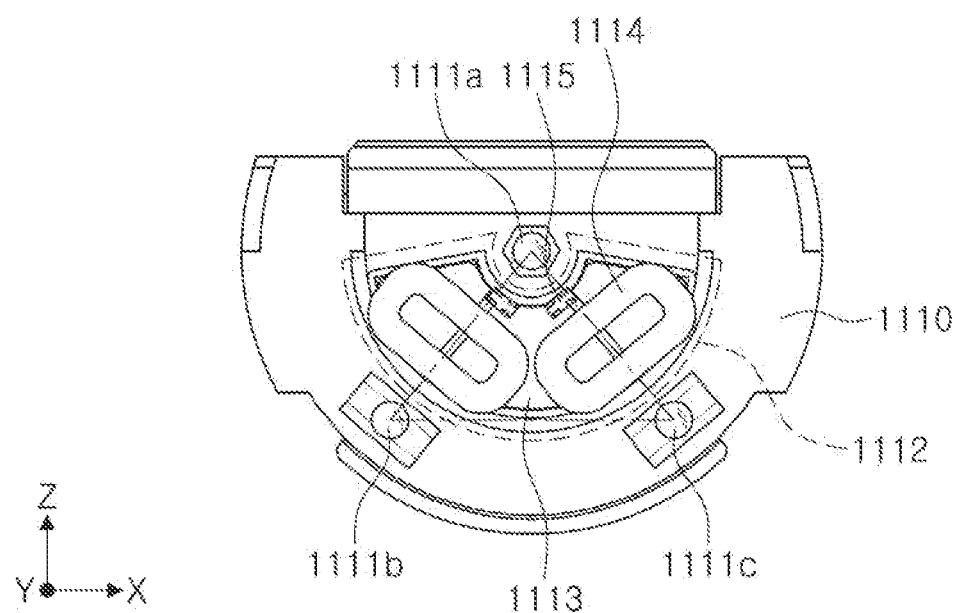
FIG. 19 is a reference diagram for explaining the arrangement of a ball member in which a carrier is supported by a housing, and a positional relationship thereof with another member, in a camera module, according to one or more examples.
Figure 20:
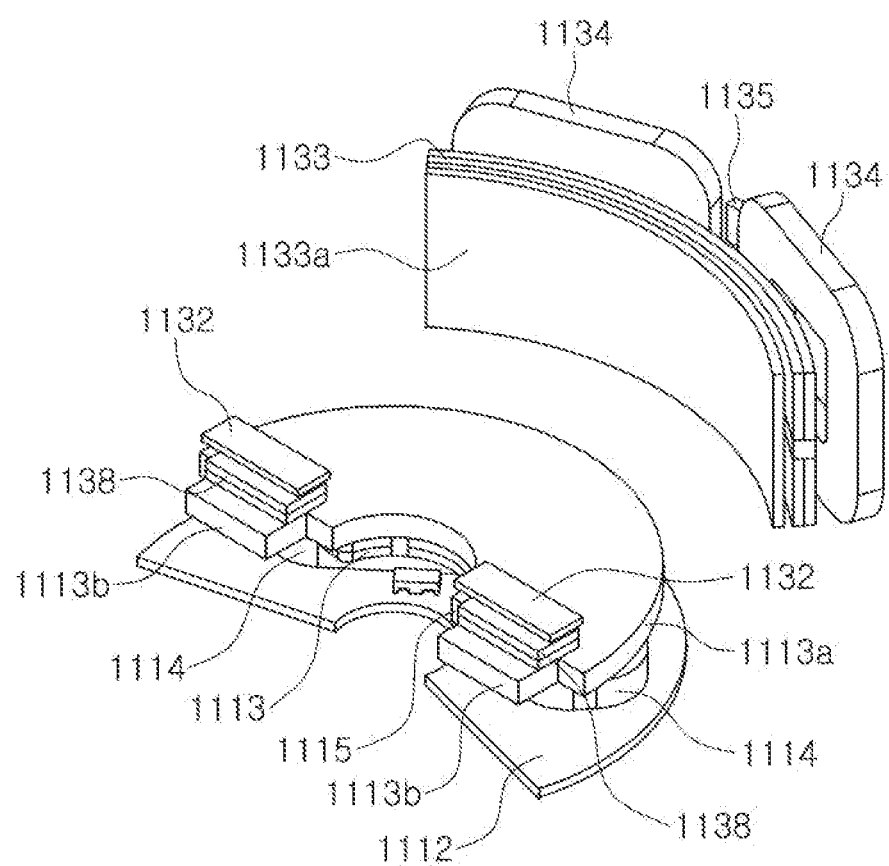
FIG. 20 is a reference diagram illustrating a driving unit used for a reflection module in a camera module according to one or more examples.

Referring further to FIGS. 18 to 20, a first coil 1114 is provided on the bottom of the housing 1010, and a first magnet 1113 facing the first coil 1114 is provided on the carrier 1110. In addition, to detect the rotation position of the carrier 1110, a first position detection sensor 1115 may be provided in the housing 1010 to face the first magnet 1113.

The first magnet 1113 may be provided in a rounded shape in consideration of the rotation of the carrier 1110. The first magnet 1113 may have an inner end and an outer end in a circular arc shape, and in more detail, the first magnet 1113 has an inner end and an outer end of a circular arc centered on the rotating shaft ball 1111*a*.

For example, the first magnet 1113 may be provided in a shape in which a donut is partially cut off. In addition, the first magnet 1113 may be provided to have an N pole and an S pole in the rotation direction.

In the carrier 1110, a rear yoke 1113*a* that maintains or further improves the performance of the first magnet 1113 by focusing magnetism on the rear surface of the first magnet 1113, for example, between the carrier 1110 and the first magnet 1113, may be further provided. In consideration of the fact that the first magnet 1113 has a rounded shape, the rear yoke 1113*a* may be provided in a relatively larger shape to face the first magnet 1113.

In addition, the first coil 1114 may also be disposed in a position corresponding to the first magnet 1113. The first coil 1114 may be provided as one or two or more first coils, and the first coil 1114 may be disposed in a rounded shape or a bent shape corresponding to the shape of the first magnet 1113. For example, when two first coils 1114 are provided, the coils may be disposed to implement a bent shape as a whole, for example, a 'V' shape.

For example, when the first magnet 1113 is magnetized with three poles of 'N pole, S pole, N pole' or 'S pole, N pole, S pole' in the rotation direction of the carrier 1110, the first coil 1114 may be provided in two so that respective coils may be disposed to face the poles at the middle and left and right ends at the same time.

For example, in the case of the 'N pole, S pole, N pole' magnet, one of the two first coils 1114 may be disposed to substantially face the N pole on the left and the left half of the S pole in the middle, and the other may be disposed to substantially face the N pole on the right and the right half of the S pole in the middle.

Of course, the first magnet 1113 may be provided as two magnets each separated by two poles, and may be disposed to face the two first coils 1114, respectively. In this case, the first magnet 1113 may have a rounded shape or a straight shape.

On the other hand, the first magnet 1113 may be provided between the first ball members (1111) 1111*a*, 1111*b*, and 1111*c*. In more detail, the first magnet 1113 may be disposed between the rotating shaft ball 1111*a* and the guide balls 1111*b* and 1111*c*.

The first ball members (1111) 1111*a*, 1111*b*, and 1111*c*, for example, one rotating shaft ball 1111*a* and two guide balls 1111*b* and 1111*c*, may be disposed in a triangular shape.

The center of gravity or the geometric center of the first magnet 1113 may be provided inside of a triangle formed by the first ball members (1111) 1111*a*, 1111*b*, and 1111*c*. The carrier 1110 is in close contact with the housing 1010 by the attraction between the first yoke 1112 and the first magnet 1113, and the carrier 1110 is not inclined to either side by the attraction generated at this time.

On the other hand, since the center of gravity or the geometric center of the first magnet 1113 is provided inside of the triangle formed by the first ball members (1111) 1111*a*, 1111*b*, and 1111*c*, when the power supply to the reflection module 1100 is stopped, the first carrier 1110 may be moved to the initial position by the attraction of the magnet 1113 and the first yoke 1112.

The initial position may be adjusted depending on the arrangement of the first magnet 1113 and the first yoke 1112, for example, in the case of the present embodiment, the position in which the reflective member 1150 is aligned parallel to the optical axis direction may be preferable.

The two first coils 1114 facing the first magnet 1113 may also be disposed between the rotating shaft ball 1111*a* and the guide balls 1111*b* and 1111*c*.

In addition, the first position detection sensor 1115 for sensing the position of the carrier 1110 may be disposed to face the first magnet 1113. The first position detection sensor 1115 may be a Hall sensor. One or two or more first position detection sensors 1115 may be provided for more accurate position detection of the carrier 1110.

The first position detection sensor 1115 may be provided between the first coil 1114 and the rotating shaft ball 1111*a* when viewed in a plan view. In the case of the rotating carrier 1110, the moving distance thereof becomes longer as the distance from the rotating shaft ball 1111*a* increases, and when moving away from the rotating shaft ball 1111*a* forming the rotating shaft by considering that the carrier 1110 of this embodiment rotates a large amount (rotation angle approximately ±25 degrees), since the movement distance increases, a relatively large number of position detection sensors may be required.

Accordingly, in the present embodiment, the first position detection sensor 1115 may be disposed in an inside of the first coil 1114, for example, on a position close to the rotating shaft ball 1111*a* forming a rotating shaft.

On the other hand, a first yoke 1112 may be provided in the housing 1010 to face the first magnet 1113. The first yoke 1112 may serve as a pulling yoke that closely contacts the carrier 1110 to the housing 1010.

In addition, the first yoke 1112 may be provided in the housing 1010 to surround (finishing) the first coil 1114, and accordingly, magnetic field (magnetic) leakage of the first magnet 1113 or the first coil 1114 may be prevented.

The first yoke 1112 may enable the carrier 1110 to be in close contact with the housing 1010 by the attraction with the first magnet 1113, and thus, the first yoke 1112 may be provided to face the first magnet 1113 with the coil 1114 or the like therebetween, in a shape similar to the first magnet 1113.

For example, the first yoke 1112 may be provided in a rounded shape in which a donut is partially cut, and may be provided to be larger than both the first magnet 1113 and the first coil 1114 to surround the same.

Figure 11:
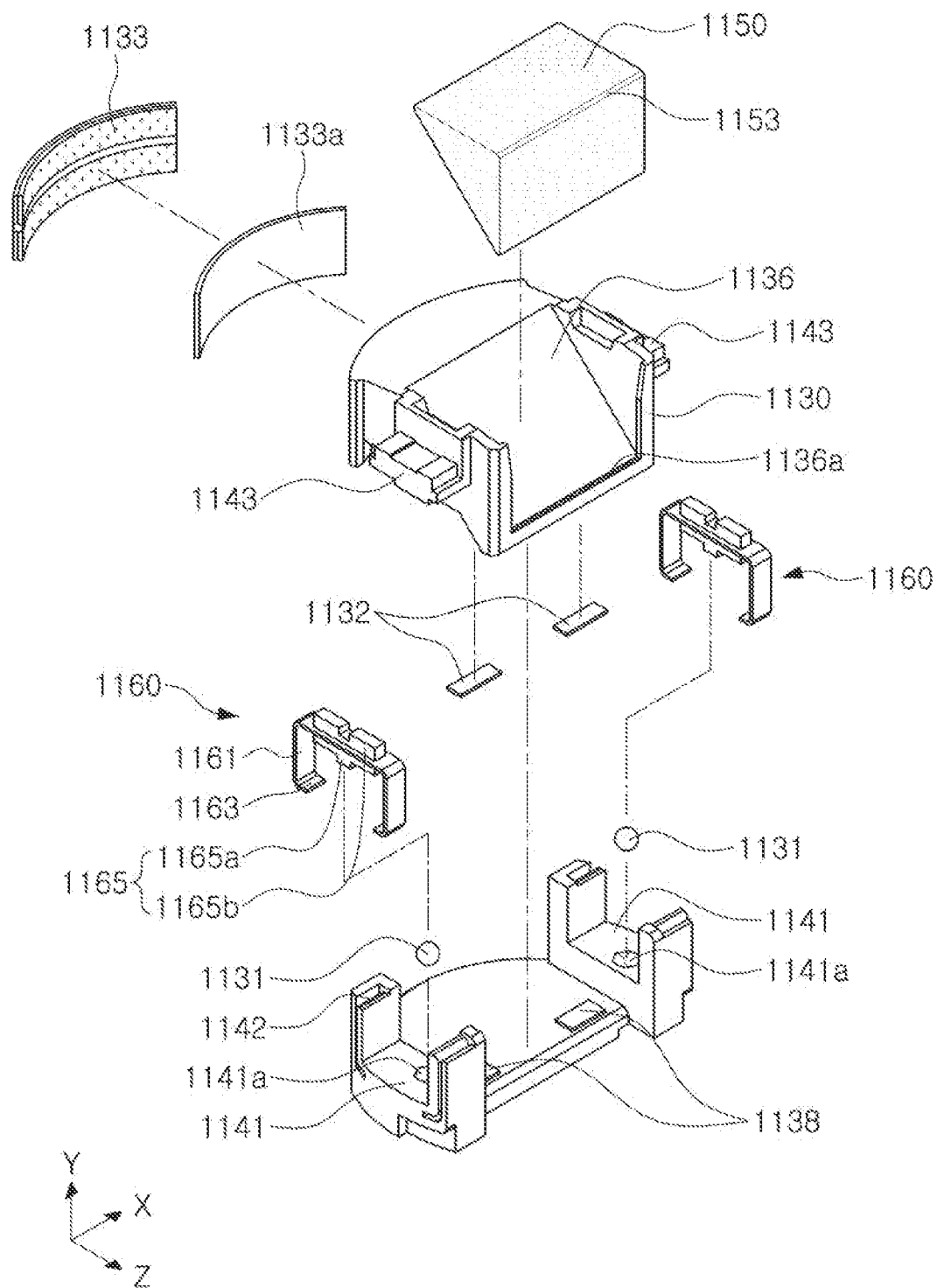
FIG. 11 is an exploded perspective view of a holder and a carrier of a camera module according to one or more examples.
Figure 12A:
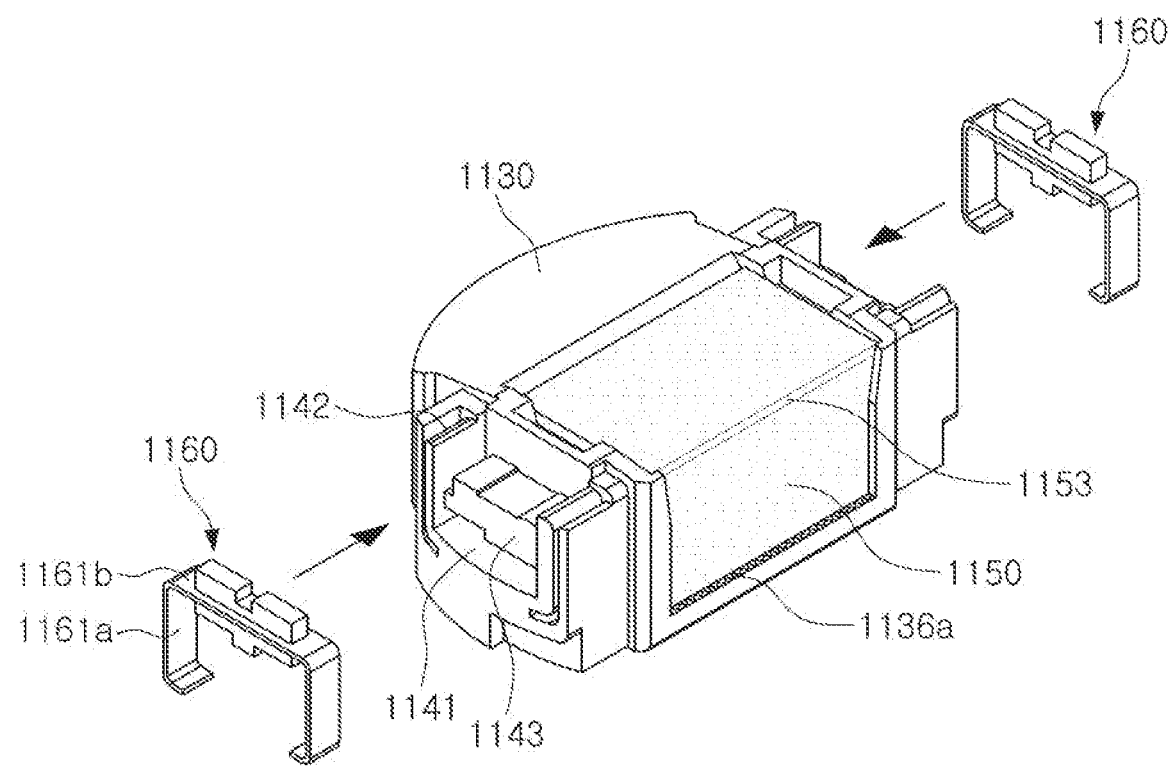
FIGS. 12A and 12B are perspective views illustrating shapes in which an auxiliary member (stopper or damper) is coupled to a carrier in a camera module according to one or more examples.
Figure 12B:
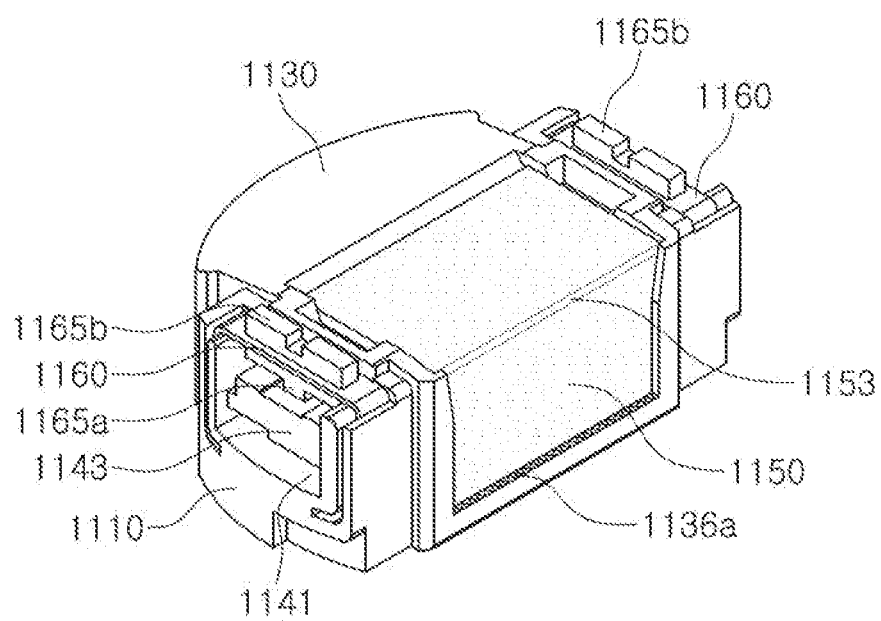
Figure 13:
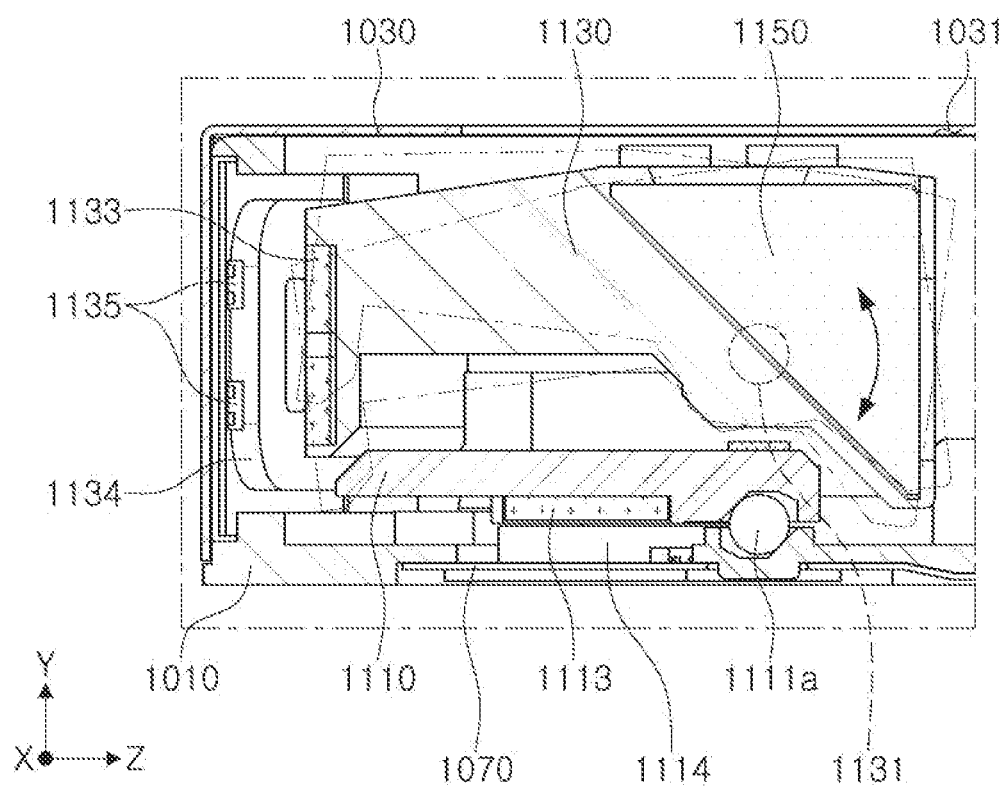
FIG. 13 is a cross-sectional view for schematically illustrating a state in which a holder rotates relative to a carrier in a camera module according to one or more examples.
Figure 14:
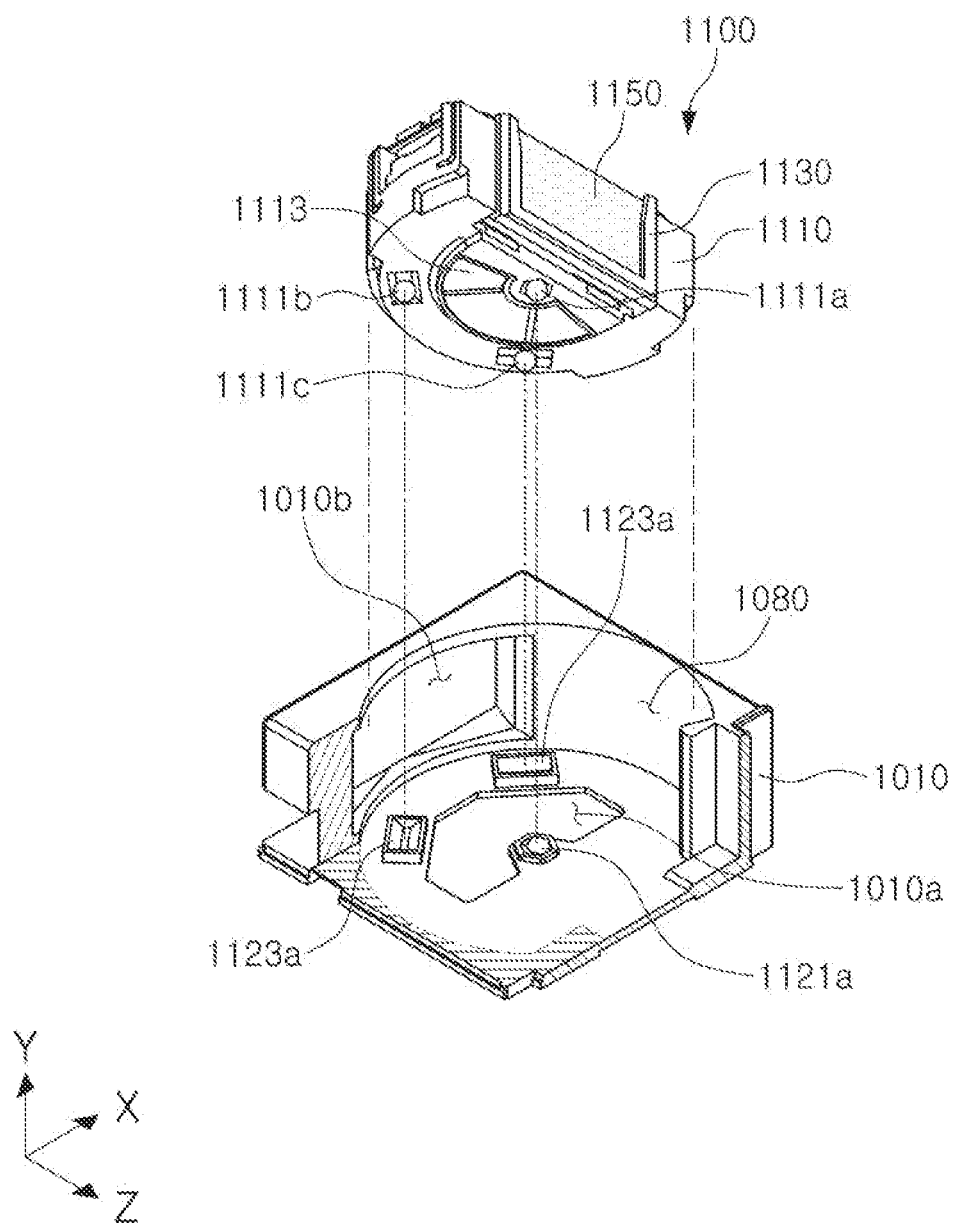
FIG. 14 is an exploded perspective view of a carrier and a housing of a camera module according to one or more examples.
Figure 15:
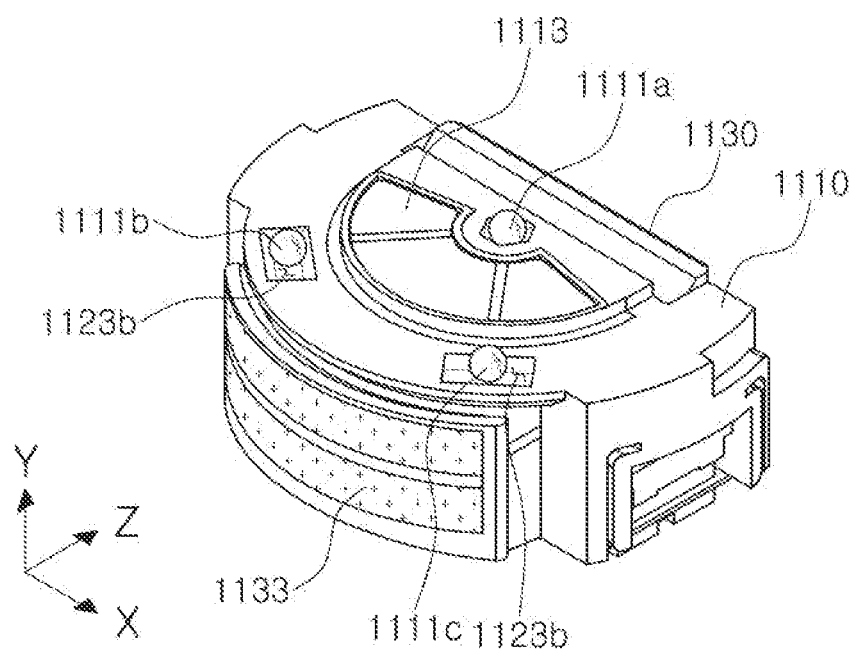
FIG. 15 is a bottom perspective view of a reflection module of a camera module according to one or more examples.

With additional reference to FIGS. 11 to 13, the rotation holder 1130 is provided in the carrier 1110. The rotation holder 1130 is provided with the reflective member 1150, and the rotation holder 1130 is rotationally driven by a second driving unit. The second driving unit includes a second magnet 1133 and a second coil 1134.

The reflective member 1150 may change the traveling direction of light. For example, the reflective member 1150 may be a mirror or a prism reflecting light (for convenience of explanation, the reflective member 1150 is illustrated as a prism in the drawings related to an embodiment).

The reflective member 1150 is fixed to the rotation holder 1130. The rotation holder 1130 is provided with a mounting surface 1136 on which the reflective member 1150 is mounted.

The mounting surface 1136 of the rotation holder 1130 may be configured as an inclined surface such that the path of light is changed. For example, the mounting surface 1136 may be an inclined surface inclined 30 to 60 degrees with respect to the optical axis (Z axis) of the plurality of lenses. The inclined surface of the rotation holder 1130 may face the opening 1031 of the cover 1030 through which light is incident.

Further, on an end of the mounting surface 1136 in the lens module (1200) direction in the optical axis direction, a plurality of protrusions 1136*a* may be provided toward the reflective member 1150 to reduce the occurrence of flares due to light reflection, diffraction, or the like.

The end of the protrusion 1136*a* may be sharply formed, and the protrusion 1136*a* may be provided over a predetermined area of the end portion of the mounting surface 1136.

The rotation holder 1130 may be supported in close contact with the carrier 1110 with two second ball members 1131 sandwiched therebetween.

Accordingly, the carrier 1110 and the rotation holder 1130 are selectively provided with a first magnetic body 1138 and a second magnetic body 1132, respectively, and the rotation holder 1130 is in close contact with the carrier 1110 by the attraction of the first magnetic body 1138 and the second magnetic body 1132.

When the first magnetic body 1138 is a magnet, for example, the fourth magnet 1138, a rear yoke is further provided on the rear surface of the fourth magnet 1138 to maintain or further improve the performance of the fourth magnet 1138 by focusing magnetism.

As illustrated in detail in FIG. 20, when the fourth magnet 1138 is provided in the carrier 1110, the rear yoke 1113*a* may be used in common. For example, the carrier 1110 is provided with the rear yoke 1113*a* that maintains or further improves the performance of the first magnet 1113 by focusing the magnetism of the first magnet 1113, and the rear yoke 1113*a* may be provided to cover the rear surface of the fourth magnet 1138 by increasing the length of the rear yoke 1113*a*. Accordingly, the rear yoke 1113*a* may include an extension portion 1113*b* extending to the rear surface of the fourth magnet 1138.

In this case, in the case of the reflection module 1100 (folded module) according to one or more examples, a first magnetic body 1138 and a second magnetic body 1132 may be provided selectively on the carrier 1110 and the rotation holder 1130. Further, the rotation holder 1130 may be provided to be supported by the carrier 1110 by the attractive force of the first magnetic body 1138 and the second magnetic body 1132. The first magnetic body 1138 and the second magnetic body 1132 may be provided to face each other in the second axis A2 direction. The reflection module 1100 (folded module) according to the present embodiment has a structure in which the rotation holder 1130 is placed on an upper portion of the carrier 1110, and thus, the rotation holder 1130 may be supported toward the carrier 1110 for driving stability.

In this case, the first magnetic body 1138 or the second magnetic body 1132 is a magnetic material, and may be a material having magnetism, for example, a material that is magnetized in a magnetic field (including both metal or non-metal materials). The first magnetic body 1138 or the second magnetic body 1132 may be a pulling magnet or a pulling yoke.

For example, when the first magnetic body 1138 is a pulling magnet, the second magnetic body 1132 may be a pulling yoke or a pulling magnet. In addition, when the first magnetic body 1138 is a pulling yoke, the second magnetic body 1132 may be a pulling magnet.

The rotation holder 1130 rotates relative to the carrier 1110 based on a first axis (an axis parallel to the X axis) connecting the two second ball members 1131 to each other.

Accordingly, the carrier 1110 is provided with two first support portions 1141 on both sides in the X-axis direction, and the rotation holder 1130 is provided with two second support portions 1143 which are mounted on the first support portions 1141 and are disposed on both sides in the X-axis direction to correspond to each other.

The second ball member 1131 may be provided between the pairs of the first support portions 1141 and the second support portions 1143 provided on both sides, respectively. In addition, the two second ball members 1131 may form a first axis A1 that is parallel to the X-axis direction and is a rotation axis of the rotation holder 1130.

Since the two second ball members 1131 need to form a rotating shaft, the positions thereof are not changed and may be rotated or fixed in place by themselves while being fixed in one place. Accordingly, the rotation holder 1130 may rotate about the first axis A1 formed by the two second ball members 1131 as an axis.

Accordingly, the first support portion 1141 and the second support portion 1143 are provided with a guide portion (for example, a groove, a notch, a collar, a divot, etc.) into which the second ball member 1131 is inserted.

The first support portion 1141 of the carrier 1110 is provided with a fifth guide portion 1141*a*, and the second support portion 1143 of the rotation holder 1130 is provided with a sixth guide portion 1143*a*, such that the second ball members 1131 are inserted.

Since the spherical second ball member 1131 should not be moved in position, at least one of the fifth guide portion 1141*a* and the sixth guide portion 1143*a* may be supported by at least three points by the second ball member 1131. In this case, the rotating shaft ball 1111*a* may be provided to be fixed to either the housing 1010 or the carrier 1110, and a guide portion that is not moved in position may be provided on the other of the housing 1010 or the carrier 1110.

For example, FIGS. 16A and 16B are reference diagrams illustrating an example of a structure in which a ball member of a camera module, according to one or more examples, is fixed to be supported by three points, on a guide portion.

Referring to FIGS. 16A and 16B, since the ball members 1111*a* and 1131 forming the rotating shaft cannot move their position, the positions thereof may be fixed by a three-point support structure.

The ball members 1111*a* and 1131 may be inserted into the guide portions 1121*a*, 1121*b*, 1141*a*, and 1143*a*.

In addition, the ball member inserted into the guide portion may maintain a supported state by contacting the guide portion only at three points P to maintain an accurate position inside the guide portion.

If the ball member contacts the guide portion at four or more points, it may be driven in a biased state, such as forming contact at only three points according to manufacturing tolerances or driving conditions of the guide portion or the ball member.

To this end, the guide portions 1121*a*, 1121*b*, 1141*a*, and 1143*a* may be provided in a shape in which each corner is cut in a triangular pyramid (tetrahedron) shape.

The spherical ball members 1111*a* and 1131 are supported at three points P on the inner side surfaces of the guide portions 1121*a*, 1121*b*, 1141*a*, and 1143*a*, and thus, the guide portions include three first surfaces 21. Therefore, the three contact points P of the ball members 1111*a* and 1131 and the guide portions 1121*a*, 1121*b*, 1141*a* and 1143*a* are formed on the first surfaces 21.

In this case, the first surface 21 is a portion of the side surface, and the side surface includes the first surface 21 on which the ball members 1111*a* and 1131 contact, and a second surface 23 provided between the first surfaces 21 (for example, provided adjacent to two of the first surfaces) and not in contact with the ball members 1111*a* and 1131.

In addition, a triangular pyramid (tetrahedron) may be implemented by extending the three side surfaces (first surfaces 21) to which the ball members 1111*a* and 1131 are respectively in point contact. For example, a line segment formed by extending the three side surfaces that are in point contact with the ball members 1111*a* and 1131 and intersect each other may implement the corners of a triangular pyramid (tetrahedron). In addition, a triangular pyramid implemented by extending three side surfaces may be an equilateral triangular pyramid.

On the other hand, the guide portions 1121*a*, 1121*b*, 1141*a*, and 1143*a* may be provided in a shape in which each vertex is cut in a triangular pyramid (tetrahedron) shape.

In the triangular pyramid, the incision on the inner apex of the guide portion may form a bottom 10 of the guide portion (1121*a*, 1121*b*, 1141*a*, 1143*a*), and the incised portions of the remaining three apexes of the guide portion on the entrance side may form the second surface 23 that does not contact the ball members 1111*a* and 1131, among the side surfaces.

Both the bottom 10 and the second surface 23 are formed by cutting off the vertices of the triangular pyramid, and thus, may all have a triangular shape, and the ball members 1111*a* and 1131 do not contact the bottom 10 and the second surface 23. In addition, the entrances of the guide portions 1121*a*, 1121*b*, 1141*a*, and 1143*a* may have a hexagonal shape because all the vertices are cut from the bottom of the triangular shape of a triangular pyramid (tetrahedron).

On the other hand, the bottoms of the guide portions 1121*a*, 1121*b*, 1141*a*, and 1143*a* may have a triangular shape.

A second coil 1134 is provided on a side surface of the housing 1010, and a second magnet 1133 facing the second coil 1134 is provided on the rotation holder 1130. In addition, to detect the rotation position of the rotation holder 1130, the housing 1010 may be provided with a second position detection sensor 1135 to face the second magnet 1133.

The second magnet 1133 may be magnetized to have an N pole and an S pole in a direction of the second axis A2 perpendicular to the first axis A1, and the rotation holder 1130 may rotate with respect to the carrier 1110 based on the first axis A1 by interaction between the second magnet 1133 and the second coil 1134.

In this case, the side surface of the housing 1010 on which the second coil 1134 is provided may mean a side surface perpendicular to the optical axis.

The rotation holder 1130 may have a rounded end portion in consideration of being provided on the carrier 1110 that rotates. In addition, the second magnet 1133 may be provided on the end of a rounded shape of the rotation holder 1130, which is an opposite side to the direction in which the reflective member 1150 is installed. Accordingly, the second magnet 1133 may also be provided in a rounded shape. The second magnet 1133 may have an inner end and an outer end in a circular arc shape, and in more detail, the second magnet 1133 has an inner end and an outer end to correspond to an arc shape of a circle centered on the rotating shaft ball 1111*a*.

On the rotation holder 1130, a rear yoke 1133*a* may further be provided to maintain or further improve the performance of the second magnet 1133 by focusing magnetism on the rear surface of the second magnet 1133, for example, between the rotation holder 1130 and the second magnet 1133. Considering that the second magnet 1133 has a rounded shape, the rear yoke 1133*a* may have a relatively larger shape corresponding to the second magnet 1133.

The second coil 1134 may also be disposed in a position corresponding to the second magnet 1133.

The second coil 1134 may be provided as one or two or more second coils, and the second coil 1134 may be disposed in a rounded shape or a bent shape to correspond to the shape of the second magnet 1133. For example, the second coil 1134 may be provided in two, and the two coils 1134 may be disposed on both sides to face the second magnet 1133, and when the second coil 1134 is provided in two, the second coils may be disposed to implement an overall bent shape, for example, a 'V' shape.

Of course, the second magnet 1133 may be provided as two separate magnets, and may also be disposed to face the two first coils 1134, respectively. In this case, the second magnet 1133 may have a rounded shape or a linear shape.

The second magnet 1133 may be provided at an end that is farthest from the first axis A1, which is a rotation axis of the rotation holder 1130. For example, the second magnet 1133 may be provided on the end of the rounded shape.

The second yoke 1132 (second magnetic body) and the fourth magnet 1138 (first magnetic body) serve as a pulling yoke and a pulling magnet, respectively, and may be optionally provided on the rotation holder 1130 or the carrier 1110. The second yoke 1132 and the fourth magnet 1138 may be respectively provided in one or two or more to face each other in the Y-axis direction.

Since the rotation holder 1130 is supported by the carrier 1110 and rotates relative thereto, the second yoke 1132 and the fourth magnet 1138 disposed to face each other may be disposed in positions not to interfere with the rotation of the rotation holder 1130.

Accordingly, in this embodiment, the second yoke 1132 and the fourth magnet 1138 are very close to the rotating shaft A1 and respectively two thereof may be provided below the first axis A1, to sufficiently exert pulling force and not to interfere with the rotation of the rotation holder 1130 as much as possible. Accordingly, the first axis A1, the second yoke 1132, and the fourth magnet 1138 may be aligned in the Y-axis direction, and may be provided on approximately the same position in the optical axis (Z-axis) direction (see FIG. 21).

The second position detection sensor 1135 for detecting the position of the rotation holder 1130 may be disposed to face the second magnet 1133. The second position detection sensor 1135 may be a Hall sensor. The second position detection sensor 1135 may be provided in one or two or more for more accurate position detection of the rotation holder 1130.

The second position detecting sensor 1135 may be provided vertically between the two second coils 1134.

On the other hand, the carrier 1110 may be provided with two first support portions 1141 protruding on both sides in the X-axis direction, and the rotation holder 1130 may be provided with two second support portions 1143 mounted on the first support portions 1141, on both sides in the X-axial direction.

In this case, the first support portion 1141 may have an open upper portion, and a structure in which the second support portion 1143 is fitted to the first support portion 1141 from the top to the lower portion may be provided.

In addition, the carrier 1110 may further include a first auxiliary member 1160 covering the open upper portion of the first support portion 1141. Since the second support portion 1143 rotates, the first auxiliary member 1160 may not be in close contact with the second support portion 1143 and may have a slight gap therewith, so as not to interfere with the rotation of the second support portion 1143.

The first auxiliary member 1160 may serve as a stopper that prevents the rotation holder 1130 from being separated from the carrier 1110 or a buffer member that absorbs the shock when the second support portion 1143 collides with other parts due to displacement.

When the second support portion 1143 is coupled to the first support portion 1141, the first auxiliary member 1160 may be fitted into the carrier 1110 through the side surface to cover the second support portion 1143 from the top. Accordingly, a slit-shaped coupling hole 1142 may be provided in the carrier 1110 such that the first auxiliary member 1160 is inserted.

The first auxiliary member 1160 may be provided with a bent portion 1163 for preventing a separation thereof on an end of a body 1161 having a E' shape for firmed coupling. In addition, the body 1161 may include a fixed portion 1161*a* of which a portion is fitted to the carrier 1110, and a damping portion 1161*b* disposed on the second support portion 1143 and coupled to a damping member 1165.

The damping member 1165 has a damping protrusion 1165*a* protruding toward the second support portion 1143, and the damping protrusion 1165*a* may be provided to face the second ball member 1131 provided on the second support portion 1143. The structure of the damping protrusion 1165*a* may efficiently perform a buffering or stopping role of the rotation holder 1130.

In addition, the damping member 1165 may further include a buffer protrusion 1165*b* protruding toward the cover 1030.

Further, in the present embodiment, when the rotation holder 1130 is separated from the carrier 1110, the end of the rotation holder 1130, for example, the upper portion of the rounded portion on which the second magnet 1133 is installed may also collide with an inner wall of the cover 1030.

Accordingly, in the present embodiment, a second auxiliary member 1040 may be provided to prevent the end of the rotation holder 1130 from colliding with the cover 1030 or to absorb an impact.

The second auxiliary member 1040 may be provided in a E shape such that an end portion thereof may be fitted to the side surface of the housing 1010 to be fixed. In addition, the second auxiliary member 1040 may be provided with a buffer member 1043 that is further provided between the second auxiliary member and the rotation holder 1130 or the cover 1030 to facilitate shock absorption.

The second ball member 1131 may be provided between the first support portion 1141 and the second support portion 1143. In addition, the two second ball members 1131 provided on both sides may form a first axis A1 that is formed as a connection line therebetween which is in parallel with the X-axis direction while being the rotation axis of the rotation holder 1130.

Figure 21:
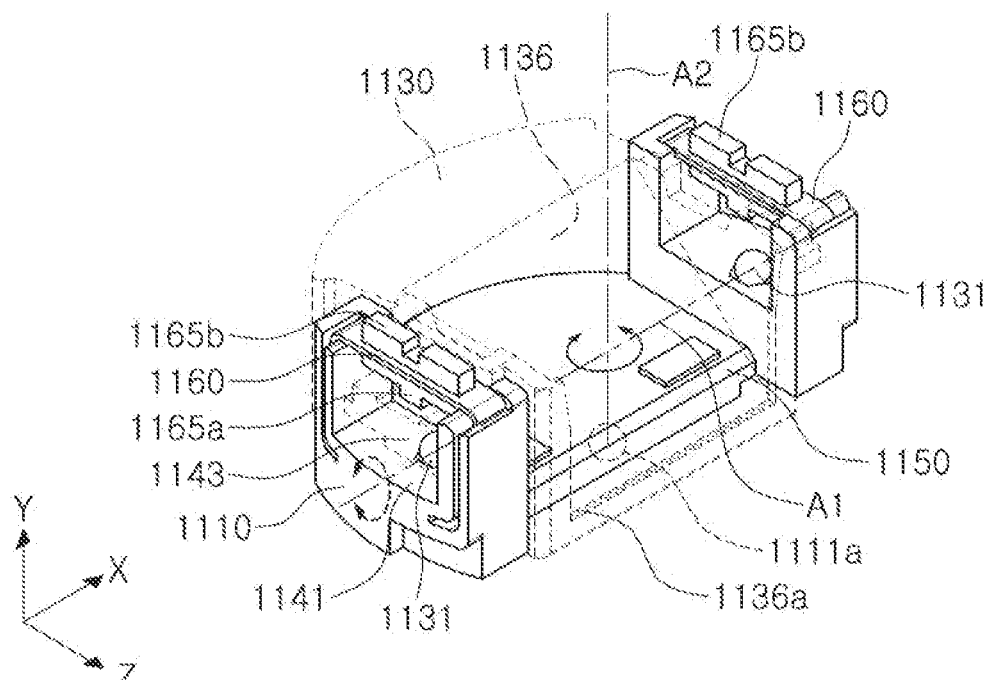
FIG. 21 is a reference diagram for explaining the positional relationship of two axes in which a reflection module rotates in a camera module according to one or more examples.

FIG. 21 is a reference diagram for explaining a positional relationship between two axes in which a reflection module rotates in a camera module, according to one or more examples.

Referring to FIG. 21, the reflection module 1100 according to one or more examples may be provided in such a manner that the reflective member 1150 rotates about two axes.

The carrier 1110 provided in the housing 1010 may rotate based on the first axis A1 formed by the rotating shaft ball 1111*a*, and the rotation holder 1130 provided in the carrier 1110 may rotate based on the second axis A2 formed by the second ball member 1131.

Accordingly, the reflective member 1150 provided in the rotation holder 1130 may rotate based on the first axis A1 and the second axis A2. In the illustration of FIG. 21, a portion illustrated by a dotted line includes the rotation holder 1130, and the rotation holder 1130 may rotate with respect to the first axis A1. In addition, a portion illustrated by a solid line includes the carrier 1110, and the carrier 1110 may rotate based on the second axis A2.

The first axis A1 and the second axis A2 intersect each other, and the rotating shaft ball 1111*a* forming the second axis A2 and the two ball members 1131 forming the first axis A1 may be disposed on a plane on which both the first axis A1 and the second axis A2 are provided. In detail, when viewed in the direction in which light is incident, for example, in the direction of the second axis A2, the rotation axis ball 1111*a* and the two ball members 1131 may be aligned in the direction of the first axis A1 perpendicular to the optical axis.

In the reflection module 1100 according to the present embodiment, the intersection of the first axis A1 and the second axis A2 may be formed at approximately the center of the mounting surface 1136 on which the reflective member 1150 is mounted. For example, the first axis A1 may be formed along the mounting surface 1136 in a direction parallel to the X-axis direction, and the second axis A2 may be provided to penetrate approximately through the center of the mounting surface 1136.

The reflective member 1150 is mounted on the mounting surface 1136, and the approximately center of the mounting surface 1136 may substantially correspond to the center of the reflective surface. Therefore, when the intersection point of the first axis A1 and the second axis A2 is formed at approximately the center of the mounting surface 1136, the actual rotation amount of the rotation holder 1130 approximately matches the rotation amount of the reflective surface, for example, the mounting surface 1136, and thus, controlling shake correction or tracking may be relatively very easy.

Figure 22A:
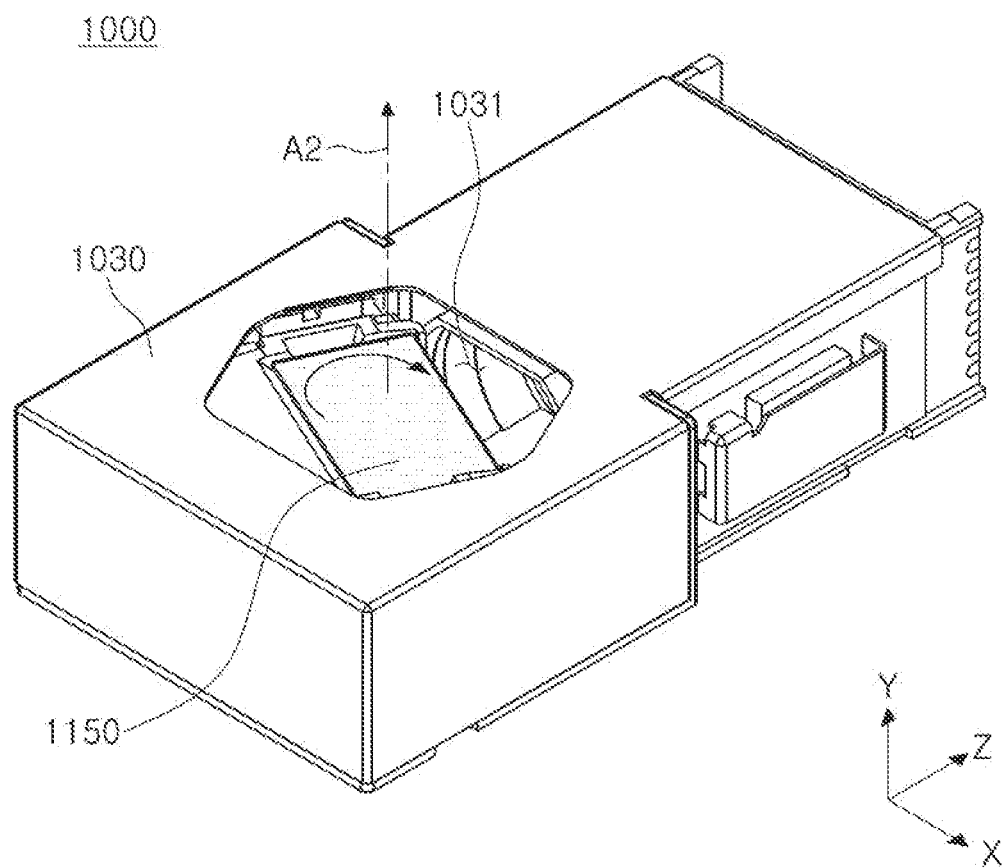
FIGS. 22A and 22B are views for explaining the shape of an opening of a cover (cover member) in a camera module according to one or more examples.
Figure 22B:
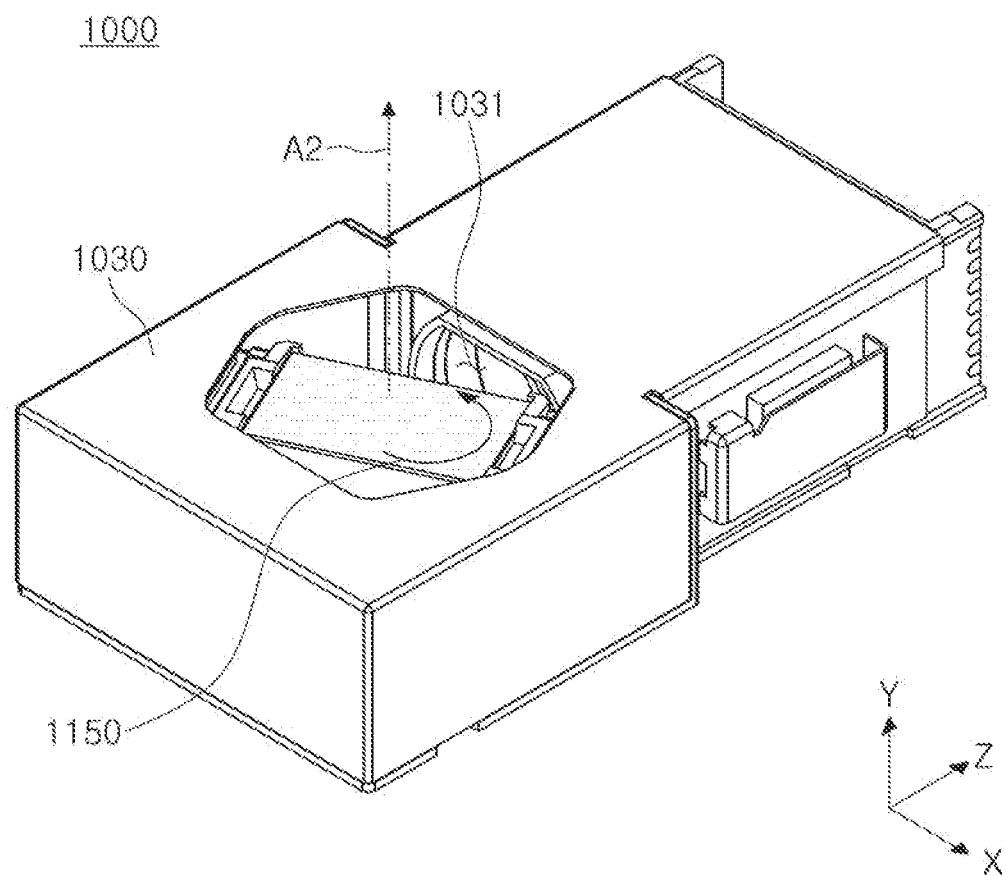

FIGS. 22A and 22B are views for explaining a shape of an opening of a cover (cover member) in a camera module, according to one or more examples.

The cover 1030 of the present embodiment includes an opening 1031 through which light is incident, and the opening 1031 may be provided in a substantially hexagonal shape.

The carrier 1110 of the reflection module 1100 rotates based on a second axis A2 parallel to the direction (Y-axis direction) in which light is incident on the camera module 1000, and the rotation angle thereof is approximately ±25 degrees as a relatively very large degree.

Therefore, the opening 1031 is provided in a substantially hexagonal shape to sufficiently receive the incident light while reducing the incidence of unnecessary light.

For example, when the carrier 1110 rotates about the second axis A2 with respect to the housing 1010, the reflective member 1150 rotates, and the angle may change slightly in a state in which the edge portion is aligned in parallel with the optical axis direction (Z axis direction). Accordingly, in consideration of a maximum rotation angle of the reflective member 1150, a side of the entrance hole positioned in the lateral direction of the housing 1010 may be formed substantially parallel to the edge of the reflective member 1150.

FIG. 22A illustrates a shape when the reflective member 1150 is rotated at a maximum in a clockwise direction with respect to the second axis A2, and FIG. 22B illustrates a shape in which the reflective member 1150 is rotated at a maximum counterclockwise with respect to the second axis A2.

Figure 23:
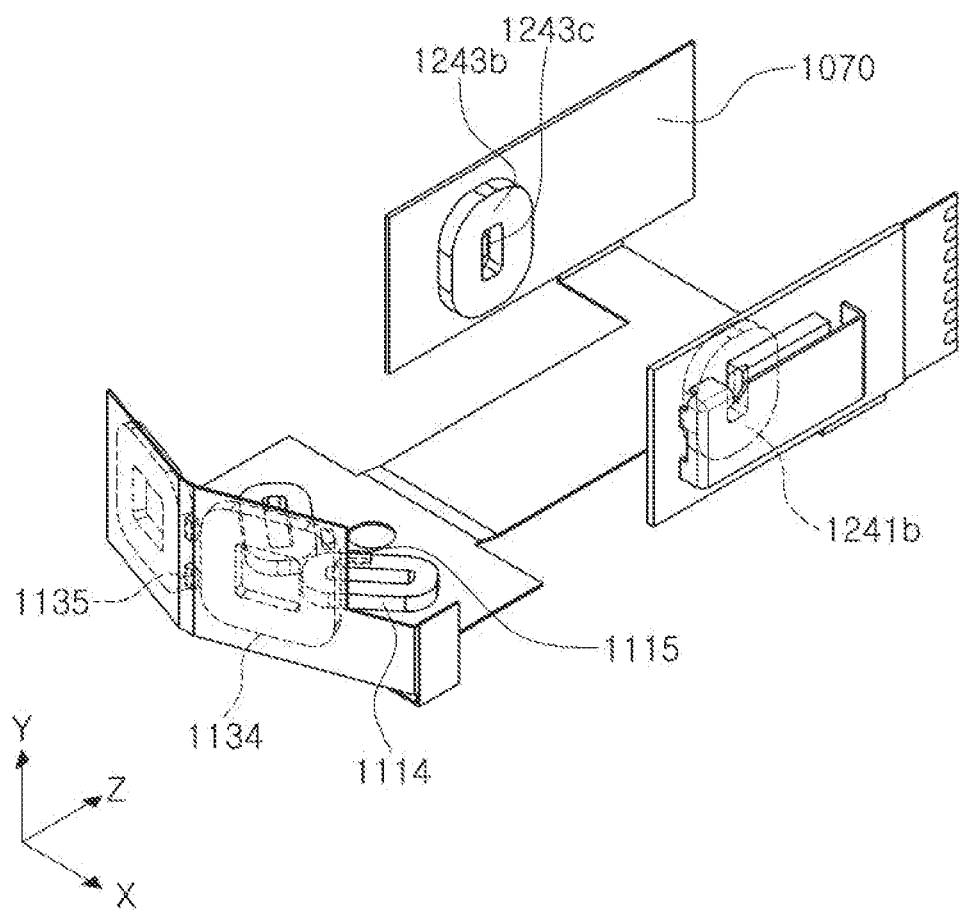
FIG. 23 is a perspective view of an integrated substrate installed in a camera module according to one or more examples.
Figure 24:
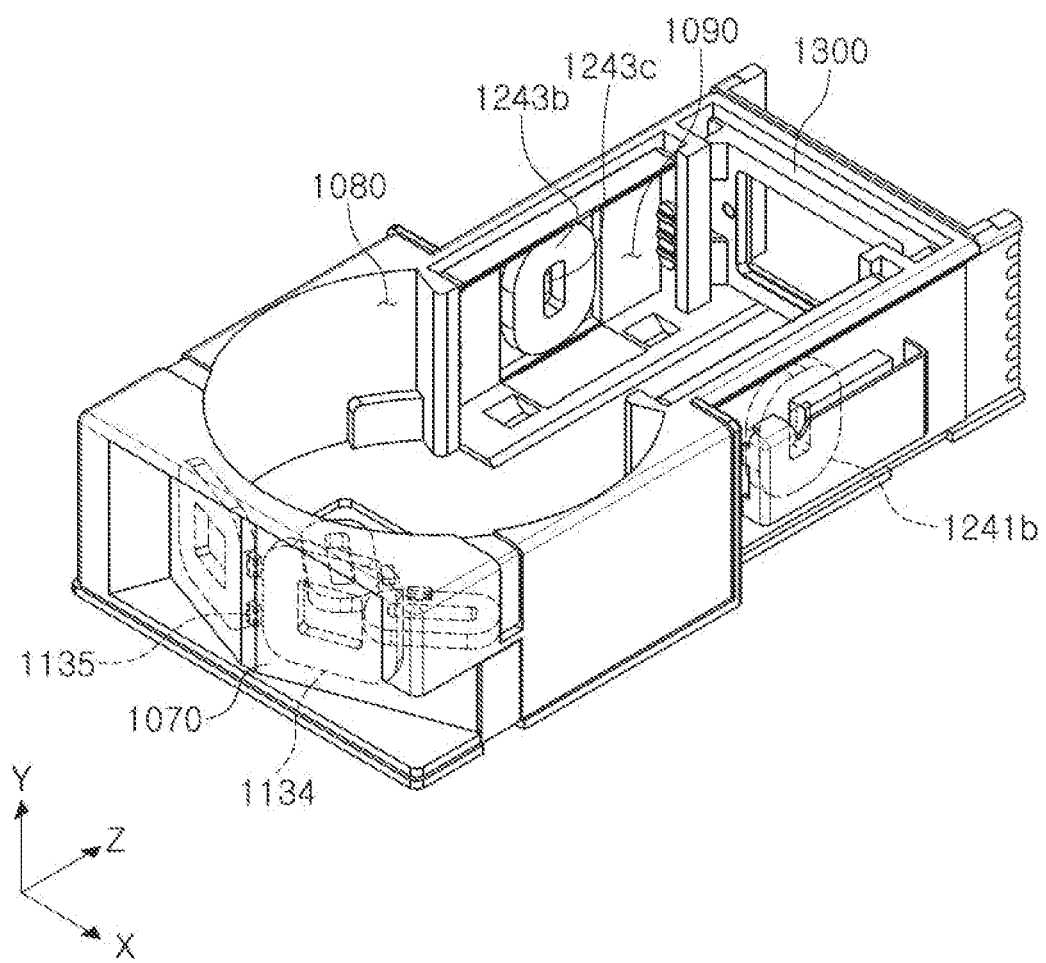
FIG. 24 is a perspective view illustrating a state in which an integrated substrate is installed in a housing of a camera module according to one or more examples.

FIG. 23 is a perspective view of an integrated substrate installed in the camera module, according to one or more examples, and FIG. 24 is a perspective view illustrating a state in which the integrated substrate is installed in the housing of the camera module, according to one or more examples.

The main substrate 1070 according one or more examples may be provided integrally. Further, the main substrate 1070 may be provided with coils 1114 and 1134 for driving the reflection module 1100 of the first and second driving units, and a plurality of coils 1241*b* and 1243*b* for driving the lens module 1200 of the third driving unit, which may be mounted on an inner surface of the main substrate. In addition, components (not illustrated) such as active devices and various passive devices, gyro sensors (not illustrated), and the like may be mounted on the outer surface of the main substrate. Accordingly, the main substrate 1070 may be a double-sided substrate.

In addition, the main substrate 1070 may be coupled to the housing 1010. Since the integrally provided main substrate 1070 is coupled to the housing 1010 in the state in which all the coils of the driving unit are mounted on the main substrate 1070, assembly may be relatively easy.

Figure 25:
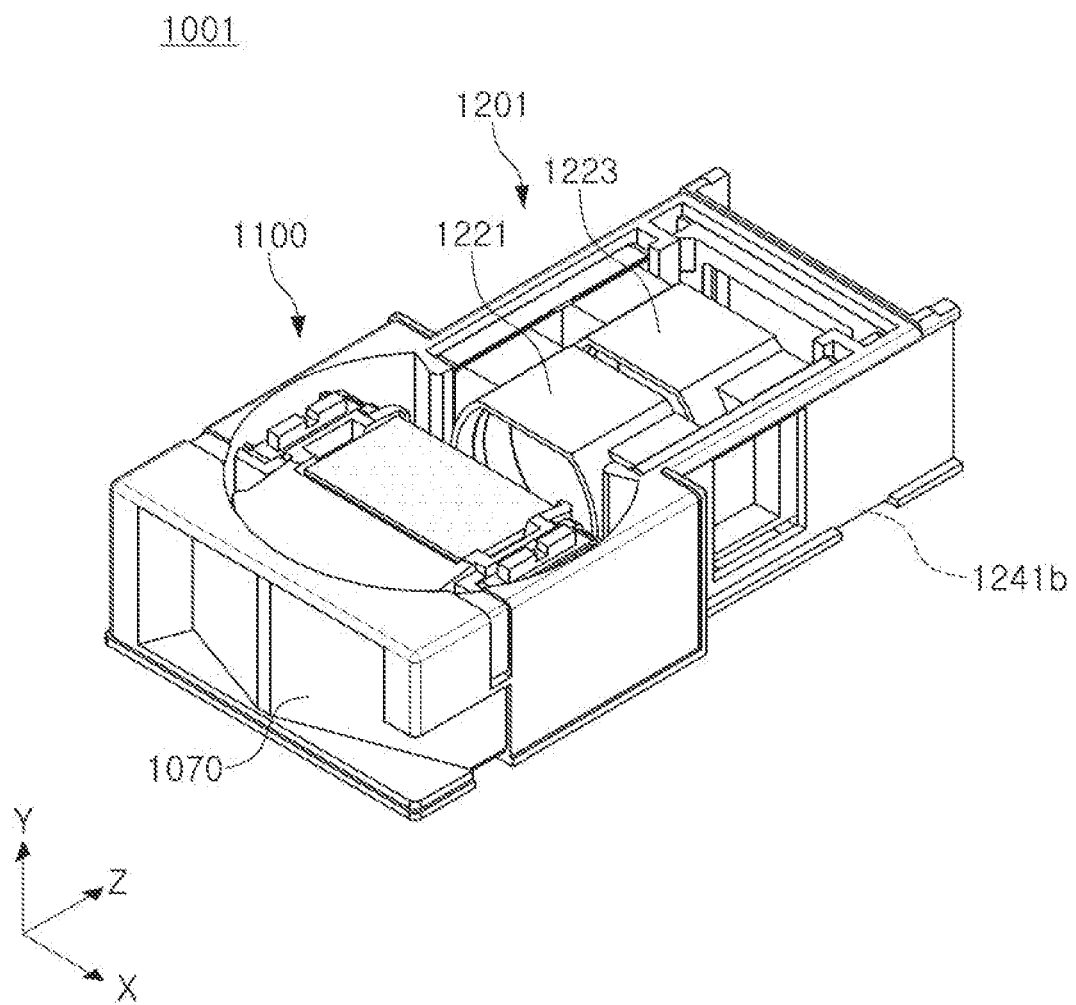
FIG. 25 is a reference diagram illustrating that a camera module has two lens barrels according to one or more other examples.
Figure 26:
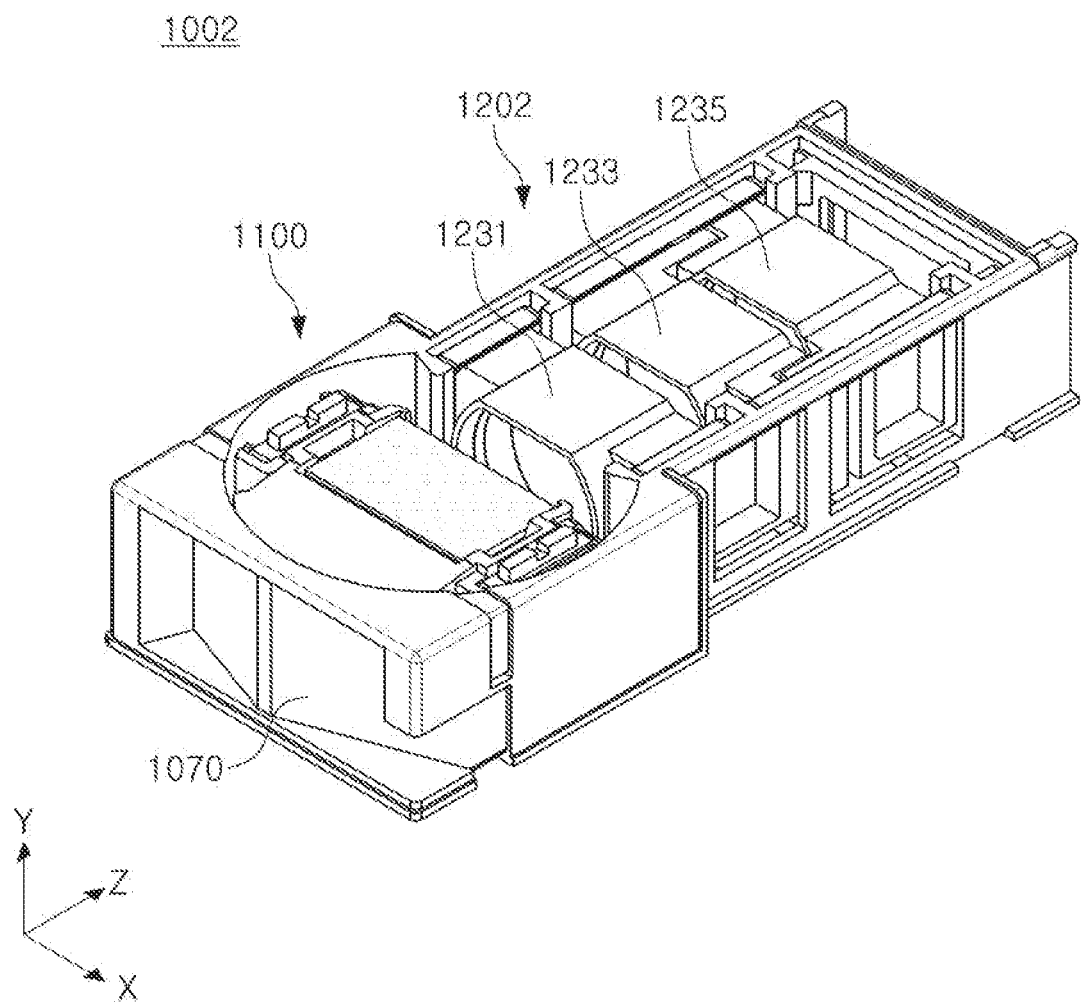
FIG. 26 is a reference diagram illustrating that a camera module has three lens barrels according to one or more still other examples.

FIG. 25 is a reference diagram illustrating two lens barrels of a camera module according to one or more other examples, and FIG. 26 is a reference diagram illustrating three lens barrels of a camera module according to one or more still other examples.

Referring to FIG. 25, a camera module 1001 according to one or more other examples may include a reflection module 1100 and a lens module 1201.

In addition, the lens module 1201 may include two or more lens holders 1221 and 1223 to implement an improved autofocusing or zoom function.

The two or more lens holders 1221 and 1223 may respectively move in the direction of the optical axis (Z axis), and may be individually controlled.

When the camera module 1001 includes two or more lens holders 1221 and 1223, one thereof may be used for autofocusing, and the remaining or all lens holders may be used to implement the zoom function. Therefore, further improved autofocusing or zoom function may be implemented.

Referring to FIG. 26, a camera module 1002 according to one or more still other examples may include a reflection module 1100 and a lens module 1202.

In addition, the lens module 1202 may include three or more lens holders 1231, 1233 and 1235 to implement an improved autofocusing or zoom function.

Any one of the three or more lens holders 1231, 1233 and 1235, for example, the lens holder 1231 provided closest to the reflection module 1100, has a fixed position, and the remaining two or more lens holders 1233 and 1235 may respectively move in the direction of the optical axis (Z axis), and may be individually controlled.

The camera module 1002 may be provided in such a manner that a portion 1231 of the lenses aligned in the optical axis direction is fixed, and two or more remaining lens holders 1233 and 1235 may move in the optical axis direction.

When a portion of the plurality of lenses is additionally provided as a fixed lens, a further improved optical effect may be implemented. In addition, since any one of the movable lens holders may be used for autofocusing, and the remaining or all lens holders may be used to implement the zoom function, further improved autofocusing or zoom function may be implemented.

Through these examples, the camera module and the portable electronic device including the camera module according to one or more examples may implement functions such as autofocusing, zoom, shake correction, PIP, tracking, etc., while the structure is relatively simple and the driving may be significantly easy.

As set forth above, according to one or more examples, shaking may be easily corrected in not only imaging a fixed subject but also in capturing video of a moving subject.

In addition, a folded module (a camera module) capable of tracking a moving subject and a portable electronic device including the same may be provided.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A folded module comprising:
a housing;
a carrier disposed in the housing; and
a rotation holder disposed on the carrier and comprising a reflective member,
wherein the carrier is rotatable, with respect to the housing, around a first axis formed by one rotating shaft ball,
wherein the rotation holder is rotatable with respect to the carrier around a second axis formed by two ball members, and
wherein the first axis and the second axis intersect each other, and the one rotating shaft ball and the two ball members are disposed on a plane comprising both the first axis and the second axis.

2. The folded module of claim 1, wherein when viewed in a first axis direction, the rotating shaft ball and the two ball members are aligned in a second axis direction.

3. The folded module of claim 1, wherein the carrier comprises a first magnet for driving, and the rotation holder comprises a second magnet for driving, and
wherein the first magnet and the second magnet have a rounded shape.

4. The folded module of claim 3, wherein inner side ends of the first magnet and the second magnet correspond to an arc shape of a circle centered on the rotating shaft ball.

5. The folded module of claim 3, wherein the housing comprises a first coil and a second coil which face the first magnet and the second magnet, in the housing.

6. The folded module of claim 5, wherein at least one of the first coil and the second coil is provided in plural.

7. The folded module of claim 6, wherein the at least one of the first coil and the second coil provided in plural is disposed in a bent shape as a whole.

8. The folded module of claim 1, wherein the carrier is supported on the housing by the one rotating shaft ball and two guide balls.

9. The folded module of claim 8, wherein the carrier comprises a first magnet for driving, and
wherein a center of the first magnet is disposed inside of a triangle formed by the one rotating shaft ball and the two guide balls.

10. The folded module of claim 8, wherein each of the guide balls is disposed in a respective first guide portion disposed in the carrier and a respective second guide portion disposed in the housing.

11. The folded module of claim 10, wherein each of the first guide portions and the second guide portions have a linear shape.

12. The folded module of claim 11, wherein one of the respective first guide portions and the respective second guide portions has a width wider than a width of the other, for the respective guide ball to only contact a bottom surface while the respective guide ball is moving.

13. The folded module of claim 11, wherein each guide ball is supported by two points on both sides of one of the respective first guide portion and the respective second guide portion, and is supported by one point only on a bottom surface of the other.

14. The folded module of claim 1, wherein positions of the one rotating shaft ball and the two ball members are fixed.

15. A portable electronic device comprising:
a plurality of camera modules having different angles of view,
wherein at least one of the plurality of camera modules is a camera module comprising the folded module of claim 1.

16. The portable electronic device of claim 15, wherein the plurality of camera modules are disposed in a plurality of cameras.

17. A folded module comprising:
a housing having an internal space of which at least a portion is rounded;
a carrier disposed in the internal space and at least partially rounded;
a driving unit comprising a coil and a rounded magnet disposed on the carrier, the driving unit being configured to rotate the carrier about a first axis with respect to the housing by virtue of a rotating ball member that forms the first axis; and
a rotation holder disposed on the carrier,
wherein both the rounded shape of the internal space and the rounded shape of the carrier correspond to a shape of an arc of a circle centered on the first axis.

18. A portable electronic device comprising:
a plurality of cameras, comprising:
a plurality of camera modules having different angles of view,
wherein at least one of the plurality of camera modules is a camera module including the folded module of claim 17.

* * * * *